US006879405B2

(12) United States Patent
Tamiya et al.

(10) Patent No.: US 6,879,405 B2
(45) Date of Patent: Apr. 12, 2005

(54) DISPLACEMENT PICKUP

(75) Inventors: Hideaki Tamiya, Kanagawa (JP);
Kayoko Taniguchi, Kanagawa (JP);
Eiko Kanbara, Kanagawa (JP)

(73) Assignee: Sony Precision Technology, Inc.,
Tokyo (JP)

( * ) Notice: Subject to any disclaimer, the term of this patent is extended or adjusted under 35 U.S.C. 154(b) by 0 days.

(21) Appl. No.: 10/705,429

(22) Filed: Nov. 10, 2003

(65) Prior Publication Data

US 2004/0095583 A1 May 20, 2004

(30) Foreign Application Priority Data

Nov. 18, 2002 (JP) ..................................... P2002-334246
Aug. 7, 2003 (JP) ..................................... P2003-289354

(51) Int. Cl.$^7$ ............................................. G01B 11/14
(52) U.S. Cl. ............... 356/616; 250/231.13; 250/237 G
(58) Field of Search .................................. 356/614–618, 356/499; 250/231.13, 231.14, 231.18, 237 G

(56) References Cited

U.S. PATENT DOCUMENTS 4,676,645 A * 6/1987 Taniguchi et al. .......... 356/494
5,017,777 A * 5/1991 Ishizuka et al. ........ 250/231.16
5,717,488 A * 2/1998 Watanabe .................... 356/499

FOREIGN PATENT DOCUMENTS

| JP | 50-23618 | 8/1975 |
| JP | 8-122097 | 5/1996 |
| JP | 8-304112 | 11/1996 |

* cited by examiner

*Primary Examiner*—Hoa Q. Pham
(74) *Attorney, Agent, or Firm*—Haverstock & Owens LLP

(57) ABSTRACT

A displacement pickup is provided which comprising a scale (12) having defined thereon a first area (12a) where positional information is recorded with a predetermined pitch and a second area (12b) where positional information is recorded with a pitch different from that in the first area (12a), a first reader (10) which reads the positional information recorded in the first area (12a), a first phase detector (14) which detects a first phase on the basis of the positional information read by the first reader (10), a second reader (11) which reads the positional information recorded in the second area (12b), a second phase detector (15) which detects a second phase on the basis of the positional information read by the second reader (11), a phase comparator (16) which makes a comparison between the first and second phases, and an origin signal selector (18) which produce a plurality of signals according to the result of comparison and selects an arbitrary one of the plurality of signals on the basis of the positional information read by the first reader (10).

39 Claims, 15 Drawing Sheets

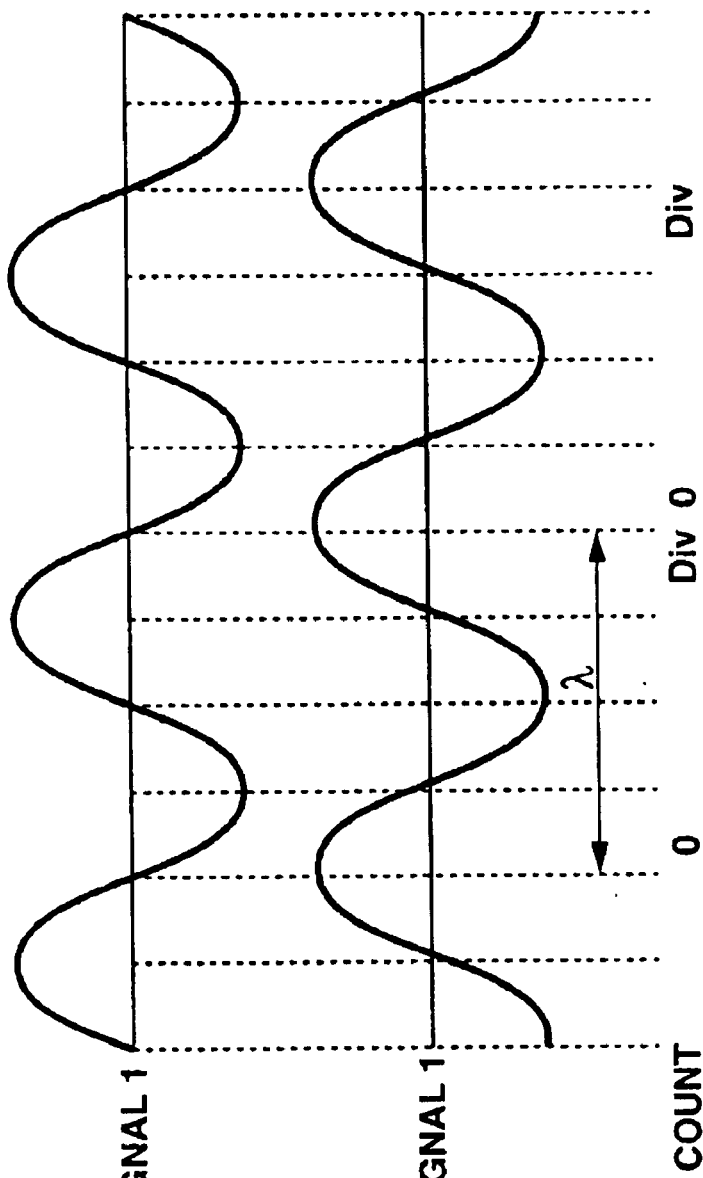
FIG.20A SIN SIGNAL 1
FIG.20B COS SIGNAL 1

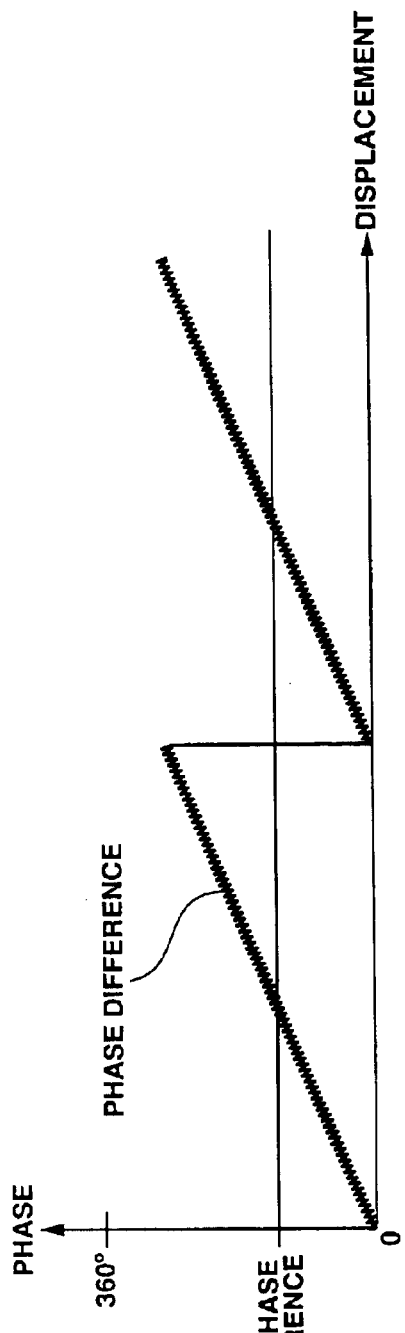
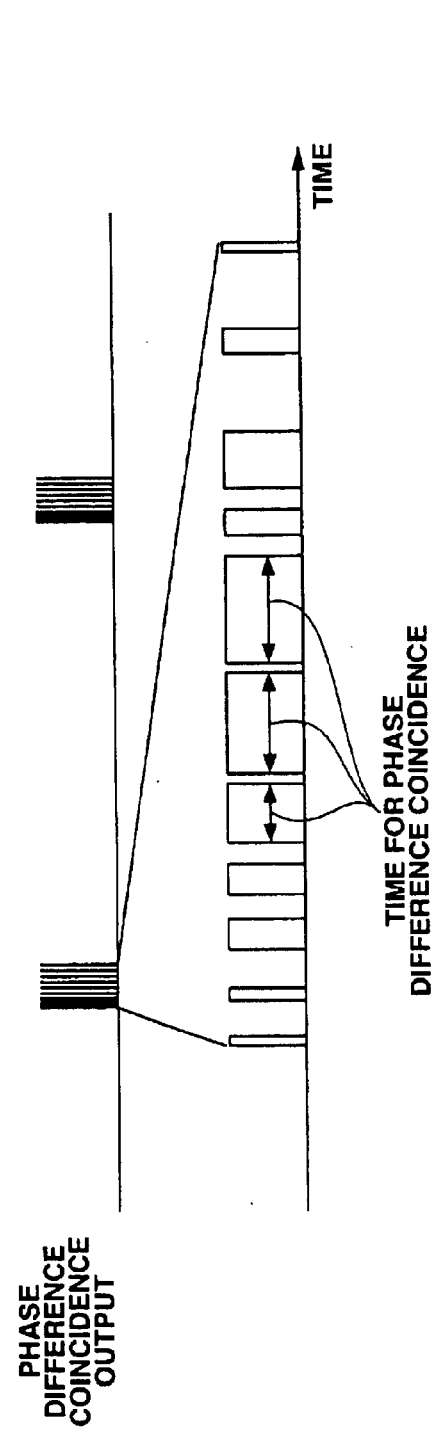
FIG.22A
FIG.22B
FIG.22C

DISPLACEMENT PICKUP

BACKGROUND OF THE INVENTION

1. Field of the Invention

The present invention generally relates to a displacement pickup which picks up a displacement on the basis of an output from a vernier scale, and more particularly to a displacement pickup with a function to detecting an origin.

This application claims the priority of the Japanese Patent Application Nos. 2002-334246 filed on Nov. 18, 2002 and 2003-289354 filed on Aug. 7, 2003, the entirety of which is incorporated by reference herein.

2. Description of the Related Art

The displacement pickup using a vernier scale is used in an X-ray pattern exposure system for manufacturing integrated circuits, precision machining, etc. In the displacement pickup of this type, a reference point or origin has to be set separately from an incremental signal indicating a travel of an object in order to measure an accurate position or distance.

Generally, in order to determine an origin through comparison of phases, first and second detected at a time, for example, of a vernier scale in the displacement pickup, the first and second phases can be compared (as in the Japanese Published Unexamined Patent Application No. 304112 of 1996). On the assumption that wavelengths of two signals supplied from the vernier scale are $\lambda$ and $(\lambda+\lambda/n)$, however, the two signals are coincident in phase with each other at intervals of $\lambda(1+n)$ and a plurality of origins exist cyclically in the measuring direction (as in the Japanese Published Examined Patent Application No. 23618 of 1975), and the in-phase points where the signals are coincident in phase with each other are detected as a population having a certain width. Also, an interpolation is done to provide a resolution smaller than the wavelength of a reproduced incremental signal (as in the Japanese Published Unexamined Patent Application No. 122097 of 1996).

When the wavelength $\lambda$ is sufficiently long, the plurality of origins can easily be discriminated between them, and an arbitrary one of the plurality of origins can be selected by an external fixed-point detecting means. If the wavelength $\lambda$ is extremely short, the interval between the plurality of origins is small and difficult to select. For example, when wavelength $\lambda$ is 0.137 $\mu$m and n=50, the interval will be 6.987 $\mu$m, so that an arbitrary one of the plurality of origins is difficult to select by the external fixed-point detecting means. It should be noted that $\underline{n}$ is an actual number other than zero.

To determine an origin through comparison between phases of the vernier scale used in the displacement pickup, two signals supplied from the vernier scale are coincident in phase with each other at intervals of $\lambda(1+n)$ and a plurality of origins exist cyclically in the measuring direction. An arbitrary one has to be selected from the plurality of origins. However, it is very difficult to select, as a reference point, an arbitrary one of the origins from a population having a certain width, in which the in-phase points can be detected. Also in case a circuit error has taken place due to a power disconnection, detector replacement or the like, it is extremely difficult to always select the same origin. On the other hand, with the substantial increase in degree of recording density realized in the recent X-ray pattern exposure system or the like, the wavelength of the incremental signal has become shorter and the interval between the in-phase points has become smaller.

OBJECT AND SUMMARY OF THE INVENTION

It is therefore an object of the present invention to overcome the above-mentioned drawbacks of the related art by providing a displacement pickup capable of selecting an arbitrary one of a plurality of origin signals detected with a precision of nanometers (nm).

It is another object of the present invention to provide a displacement pickup capable of selecting a population from the populations each consisting of in-phase points periodically located in the measuring direction and selecting as a reference point an arbitrary point from said selected population, and reproducing the reference point (origin) with a precision of nanometers (nm) even if a circuit error has taken place due to a power disconnection, detector replacement or the like.

The above object can be attained by providing a displacement pickup including, according to the present invention, a movable scale having defined thereon a first area where positional information is recorded with a predetermined pitch and a second area where positional information is recorded with a pitch different from that in the first area; a first reading means for reading the positional information recorded in the first area; a first phase detecting means for detecting a first phase on the basis of the positional information read by the first reading means; a second reading means for reading the positional information recorded in the second area; a second phase detecting means for detecting a second phase on the basis of the positional information read by the second reading means; a phase comparing means for comparing the first and second phases with each other; and a signal selecting means for generating a plurality of signals according to a result of the comparison from the phase comparing means and selecting an arbitrary one of the plurality of signals on the basis of the positional information read by the first reading means, the first and second areas being formed on the scale to be displaceable equal distances in the same measuring direction.

According to the present invention, the above displacement pickup is also designed to pick up a displacement (travel) from information on the phase of moving side by determining a phase difference from two kinds of positional information supplied from a vernier scale, recording a phase when an arbitrary signal is supplied as a reference phase difference, and recording the phase of the moving side as a reference point (origin position) when it is detected that per-displacement phase differences coincide with each other.

Also the above object can be attained by providing a displacement pickup in which first phase information having an arbitrary period and second phase information having a period different from that of the first phase information are detected by a pickup head block from a scale to pickup up positional information from the first and second phase information, the apparatus including, according to the present invention, a polar coordinate transform unit which transforms the first and second positional information into angular data indicating positions of the scale and pickup head block in relation to each other and amplitude data; a phase difference detector which detects a difference between phase data 1 which is the angular data resulted from transformation of the first phase information by the polar coordinate transform unit and phase data 2 which is the angular data resulted from transformation of the second phase information by the polar coordinate transform unit; a reference phase difference recorder which records, as a reference phase difference, the difference between the first and second phase data 1 and 2 at a time when an arbitrary signal is supplied; a phase-difference coincidence detector which detects when the per-displacement phase difference detected by the phase difference detector and the reference phase difference recorded in the reference phase difference recorder are coincident with each other; a phase data recorder which records the phase data 1 and/or 2 at a time when the coincidence between the phase differences is detected by the phase-difference coincidence detector; and a reference point signal detector which detects, at each displacement, coincidence between the phase differences and coincidence between the phase data 1 or 2 recorded in the phase data recorder and the phase data 1 or 2 supplied from the polar coordinate transform unit to produce a reference point signal.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIGS. 3A and 3B schematically illustrates a first pattern of diffraction gratings recorded in a second area on a scale on which the displacement pickup in FIG. 1 picks up an origin point, in which FIG. 3A shows a first pattern in which the pitch of the diffraction gratings is increased linearly in the measuring direction and FIG. 3B shows a first pattern in which the pitch of the diffraction gratings is decreased linearly in the measuring direction;

FIGS. 10A and 10B schematically illustrate a second area formed from a volume hologram, in which FIG. 10A is a top plan view and FIG. 10B is a side elevation;

FIGS. 20A and 20B show signal waveforms of phase data supplied from the displacement pickup, in which FIG. 20A shows a sin signal 1 and FIG. 20B shows a cos signal 1;

FIGS. 21A and 21B show phase data 1 and 2 and difference between the phase data 1 and 2 in the displacement pickup, in which FIG. 21A shows the phase data 1 and 2 and FIG. 21B shows the phase difference;

FIGS. 22A to 22C explain how the displacement pickup detects coincidence between phases, in which FIG. 22A shows a phase difference and reference phase difference, FIG. 22B shows a Hi signal produced when phase coincidence is detected and FIG. 22C shows the Hi signal as enlarged in scale in the time-base direction;

DETAILED DESCRIPTION OF THE PREFERRED EMBODIMENTS

Figure 1:
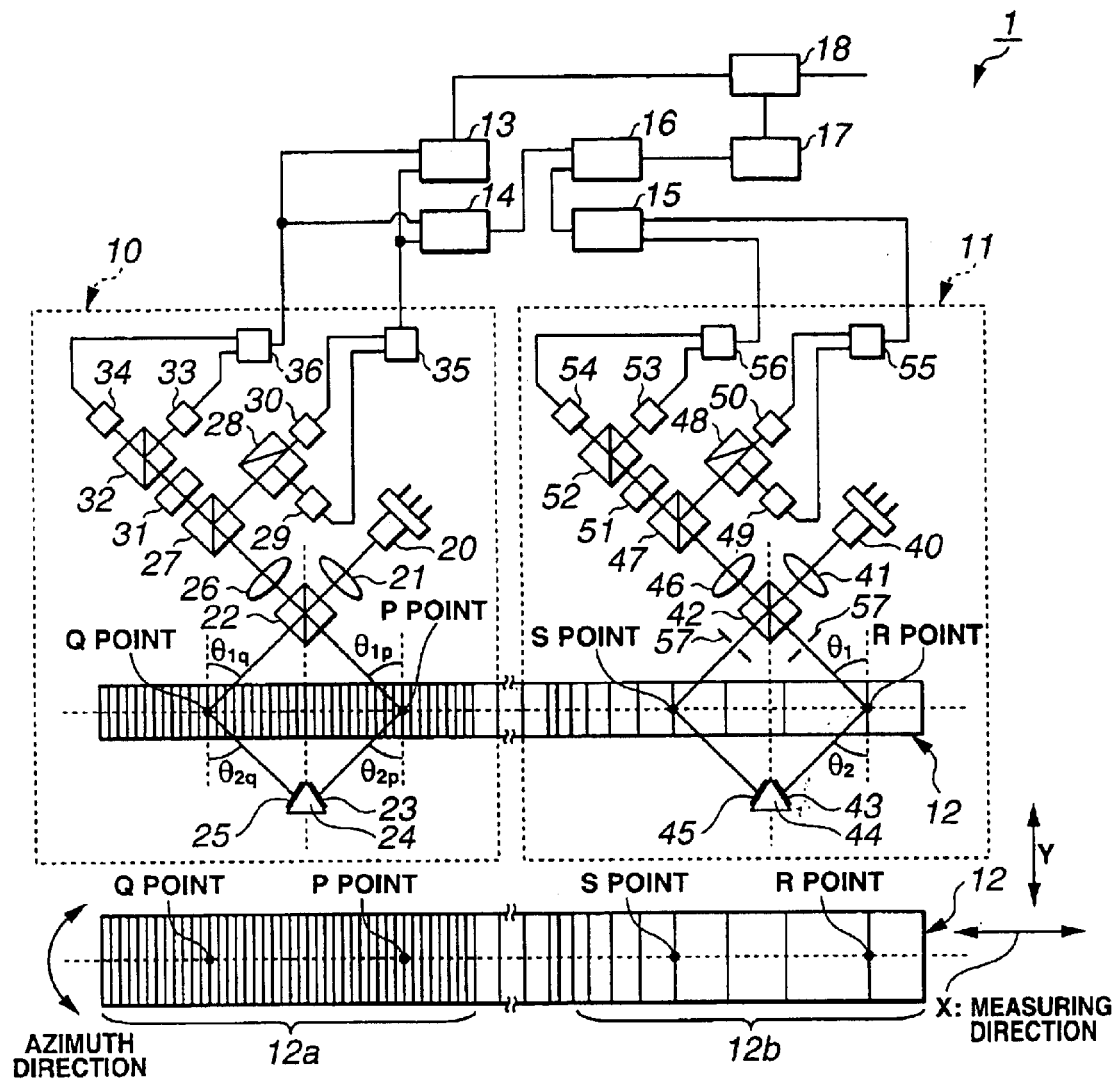
FIG. 1 is a block diagram of a first embodiment of the displacement pickup according to the present invention.

The embodiments of the displacement pickup according to the present invention will be described in detail below with reference to the accompanying drawings:

The present invention is applied to a displacement pickup constructed as shown in FIG. 1. The displacement pickup is generally indicated with a reference number 1.

As shown, the displacement pickup 1 includes a first optical system 10, second optical system 11, scale 12, incremental signal generator 13, first phase detector 14, second phase detector 15, phase comparator 16, pulse signal generator 17 and an origin signal selector 18.

As shown in FIG. 1, the first optical system 10 includes a coherent light source 20, first lens 21, first polarization beam splitter (PBS) 22, first quarter-wavelength plate 23, reflection prism 24, second quarter-wavelength plate 25, second lens 26, beam splitter (BS) 27, second PBS 28, first photoelectric transducer 29, second photoelectric transducer 30, third quarter-wavelength plate 31, third PBS 32, third photoelectric transducer 33, fourth photoelectric transducer 34, first differential amplifier 35 and a second differential amplifier 36. In this optical system 10, any one of the diffraction gratings recorded on the scale 12 is read, and the result of reading is supplied to the incremental signal generator 13 and first phase detector 14.

The scale 12 will be explained here. The scale 12 has defined at one side thereof with respect to a measuring direction X a first area 12a in which the diffraction gratings are recorded with a pitch Λ, and at the other side a second area 12b where the diffraction gratings are recorded with a pitch Λ+Λ/n (where n is an actual number other than zero). It should be noted that the diffraction gratings may be recorded with an other pitch than the above in the second area 12b, which will further be described later.

The pitch Λ is 0.55 µm, for example. In the scale 12, points of incidence (P and Q) upon the first area 12a and those (R and S) upon the second area 12b are laid in line with the measuring direction. It should be noted that the first and second areas 12a and 12b may be defined on the same scale or on separate scales, respectively. In the latter case, the scales are fixed on the same pedestal to be equally displaceable in the same direction of displacement.

The coherent light source 20 emits a beam of light to the first lens 21. The first lens 21 converges the incident light beam appropriately and directs it to the first PBS 22. The first PBS 22 splits the incident light beam into two light components: an S-polarized one and P-polarized one. The first PBS 22 lets the light beam containing the S-polarized light component be incident upon the P point and light beam containing the P-polarized light component be incident upon the Q point so that the optical path up to the P point in the first area 12a of the scale 12 is centrosymmetric with the optical path up to the Q point. It should be noted that when the light beam from the coherent light source 20 is a plane-polarized one, the direction of polarization is inclined 45 deg. for incidence of the light beam upon the first PBS 22. Thereby it is possible to equalize the intensity of the S-polarized light component with that of the P-polarized light component.

Also, the light beams incident upon the P and Q points, respectively, are diffracted in directions, respectively, given by the following formula:

$$\sin \theta_1 + \sin \theta_2 = n \cdot \lambda / \Lambda$$

where $\theta_1$ indicates an angle of incidence upon the scale 12, $\theta_2$ indicates an angle of diffraction from the scale 12, Λ indicates a pitch (width) of the gratings, λ indicates the wavelength of the light beam, and n indicates a degree of diffraction as shown in FIG. 1.

In the displacement pickup 1, such an adjustment is made that on the assumption that the angle of incidence upon the P point is $\theta_{1p}$, the angle of diffraction from the P point is $\theta_{2p}$, angle of incidence upon the Q point is $\theta_{1q}$ and angle of diffraction from the Q point is $\theta_{2q}$, $\theta_{1p}=\theta_{1q}$ and $\theta_{2p}=\theta_{2q}$. Also, the degree of diffraction is the same at the P and Q points, and it is primary in the displacement pickup 1.

The light beam diffracted at the P point passes through the first quarter-wavelength plate 23, is reflected vertically by the reflection prism 24 back to the P point, and is diffracted by the diffraction grating. At this time, the light beam having returned to the P point is a P-polarized light component since the optical axis of the first quarter-wavelength plate 23 is inclined 45 deg. in relation to the polarized direction of the incident light beam.

Similarly, the light beam diffracted at the Q point passes through the second quarter-wavelength plate 25, is reflected vertically by the reflection prism 24 back to the Q point, and is diffracted by the grating. At this time, the light beam having returned to the Q point is an S-polarized light component since the optical axis of the second quarter-wavelength plate 25 is inclined 45 deg. in relation to the polarized direction of the incident light beam.

The light beams having been diffracted again at of the P and Q points return to the first PBS 22.

Since the light beam having returned from the P point contains the P-polarized light component, it is allowed by the first PBS 22 to pass through, while the light beam having returned from the Q point is reflected by the first PBS 22 because it contains the S-polarized light component. Therefore, the light beams having returned from the P and Q points are superposed on each other in the first PBS 22 and incident upon the second lens 26.

Here will be described the relation in length between an optical path up to the first quarter-wavelength plate 23 via the P point from the first PBS 22 and an optical path up to the second quarter-wavelength plate 25 via the Q point. It should be noted that in the displacement pickup 1, the optical path up to the first quarter-wavelength plate 23 via the P point from the first PBS 22 is centrosymmetric with that up to the second quarter-wavelength plate 25 via the Q point from the first PBS 22.

For preventing any error caused by a variation in wavelength of the light source in this embodiment, the length of the optical path up to the first quarter-wavelength plate 23 via the P point, along which the light beam containing the S-polarized light component from the first PBS 22 travels, is adjusted to be equal to that of the optical path up to the second quarter-wavelength plate 25 via the Q point, along with the light beam containing the P-polarized light component from the first PBS 22. The accuracy of this adjustment depends a necessary accuracy of length measurement and an ambient temperature at which the displacement pickup 1 is used. On the assumption that the necessary accuracy of length is ΔE, scale pitch is Λ, wavelength of the light source is λ and variation in wavelength due to a temperature variation is Δλ, the difference ΔL in length between the above optical paths has to meet the following formula:

$$\Delta E > \Delta \lambda / \lambda^2 \times 2 \times \Delta L \times \Lambda / 4$$

On the assumption that the variation of the operating ambient temperature is 10° C. for example, the variation in wavelength of a generally used semiconductor laser of 780 nm in wavelength is about 3 nm. In this case, when the scale pitch Λ=0.55 µm and the necessary accuracy of length measurement ΔE is 0.1 µm, the difference ΔL in length between the above optical paths has to be ΔL<74 µm. For adjustment of the difference ΔL, a light source having an appropriate coherence length should be used.

Generally, the visibility representing a degree of modulation of the interference fringe in an interferometer depends upon the coherence of the light source and difference in length between two optical paths along which two light beams interfering with each other travel, respectively. It is well known that a light source having a good coherence such as a laser or the like which oscillates in a single mode will not lose the visibility even if there is a large difference in length between the optical paths, while with a light source having no good coherence, the visibility of the interference fringe will vary depending upon a variation in the difference in length between two optical paths.

Since with a light source having a good coherence as above, a difference in length between the two optical paths can be detected as a reduced degree of modulation (visibility) of an interference signal, so the optical paths can be made equal in length to each other through such an adjustment that the degree of modulation of the interference signal is maximum. For example, with a semiconductor laser of about 200 µm in coherence length and which oscillates in multiple modes, the difference ΔL in length between the optical paths can easily be set smaller than 74 µm.

Also, only for the above adjustment, the coherent light source 20 may be a light source whose coherence length is limited, and after the adjustment, it may be replaced with another inexpensive light source whose coherence length is large (for example, a typical semiconductor laser which oscillates in a single mode).

The second lens 26 converges the incident beam of light for incidence upon the BS 27. The BS 27 divides the incident light beam by two, of which the one is incident upon the second PBS 28 and the other is incident upon the third quarter-wavelength plate 31. It should be noted that the second PBS 28 and third quarter-wavelength plate 31 are at an angle of 45 deg. with respect to the polarized direction of the incident light beam.

The second PBS 28 splits the incident light beam into two light beams: one containing S-polarized light component and one containing P-polarized light component, and allows the light beam containing the S-polarized light component to pass through for incidence upon the first photoelectric transducer 29 while allowing the light beam containing the P-polarized light component to pass through for incidence upon the second photoelectric transducer 30. The first and second photoelectric transducers 29 and 30 produce interference signals of Acos $(4Kx+\delta)$ where K indicates $2\pi/\Lambda$, $\underline{x}$ indicates a travel, and $\delta$ indicates an initial phase. The first photoelectric transducer 29 produces an interference signal whose phase is shifted 180 deg. from that of an interference signal the second photoelectric transducer 30 produces.

Also, the third quarter-wavelength plate 31 produces, from the incident light beam, a circularly polarized light beam in which light beams containing P- and S-polarized light components, respectively, rotate in opposite directions and are superposed on each other to provide a plane-polarized light beam. This plane-polarized light beam is incident upon the third PBS 32. The third PBS 32 splits the incident plane-polarized light beam into a light beam containing S-polarized light component for incidence upon the third photoelectric transducer 33 and a light beam containing P-polarized light component for incidence upon the fourth photoelectric transducer 34. It should be noted that the polarized direction of the plane-polarized light beam incident upon the third PBS 32 rotates one turn when the diffraction gratings move $\Lambda/2$ in the direction of arrow x. Therefore, the third and fourth photoelectric transducers 33 and 34 can produce interference signals of Acos $(4Kx+\delta')$ similarly to the first and second photoelectric transducers 29 and 30.

The third photoelectric transducer 33 produces a signal whose phase is 180 deg. different from that of a signal produced by the fourth photoelectric transducer 34. It should be noted that the third PBS 32 is disposed at an angle of 45 deg. with respect to the second PBS 28. Therefore, the signals produced by the third and fourth photoelectric transducers 33 and 34 are 90 deg. different in phase from signals produced by the first and second photoelectric transducers 29 and 30.

The first differential amplifier 35 makes a differential amplification of the electric signals supplied from the first and second photoelectric transducers 29 and 30 to produce a signal in which a DC (direct current) component of the interference signal has been canceled, and supplies it to the incremental signal generator 13 and first phase detector 14. Also, the second differential amplifier 36 makes a similar differential amplification of the electric signals supplied from the third and fourth photoelectric transducers 33 and 34 to provide a signal of which a DC component of the interference signal has been canceled, and supplies it to the incremental signal generator 13 and first phase detector 14.

Figure 2:
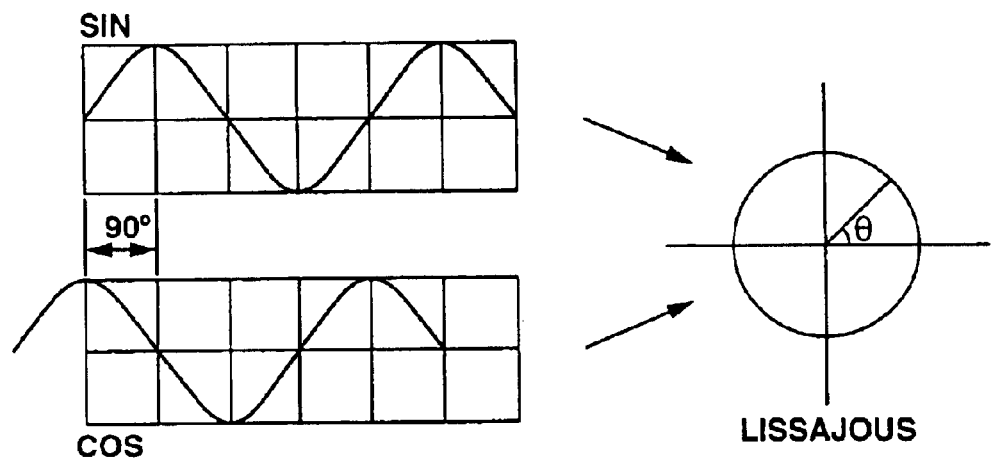
FIG. 2 shows an angle of Lissajous signal produced by the displacement pickup in FIG. 1.

The incremental signal generator 13 determines a displaced direction and extent of the scale on the basis of the signals supplied from the first and second differential amplifiers 35 and 36 to produce an incremental signal. The incremental signal generator 13 provides the incremental signal to the origin signal selector 18. The first phase detector 14 determines an angle $\theta_a$ of a Lissajous signal as shown in FIG. 2 on the basis of signals supplied from the first and second differential amplifiers 35 and 36. The first phase detector 14 will supply the angle $\theta_a$ thus determined to the phase comparator 16.

As shown in FIG. 1, the second optical system 11 includes a coherent light source 40, first lens 41, first polarized beam splitter (PBS) 42, first quarter-wavelength plate 43, reflection prism 44, second quarter-wavelength plate 45, second lens 46, beam splitter (BS) 47, second PBS 48, first photoelectric transducer 49, second photoelectric transducer 50, third quarter-wavelength plate 51, third PBS 52, third photoelectric transducer 53, fourth photoelectric transducer 54, first differential amplifier 55 and a second differential amplifier 56. In this second optical system 11, any one of the diffraction gratings recorded on the scale 12 is read, and the result of reading is supplied to the second phase detector 15. It should be noted that since the second optical system 11 operates similarly to the aforementioned first optical system 10.

Similarly to the first phase detector 14, the second phase detector 15 determines an angle $\theta_b$ of a Lissajous signal on the basis of signals supplied from the first and second differential amplifiers 55 and 56, and supplies it to the phase comparator 16.

The phase comparator 16 functions as will be described below. In the first phase detector 14, when the scale 12 displaces $\Lambda/4$ in a predetermined measuring direction, the angle $\theta_a$ of the Lissajous signal rotates one turn. In the second phase detector 15, when the scale 12 displaces $(\Lambda+\Lambda/n)/4$ in a predetermined measuring direction, the angle $\theta_b$ of the Lissajous signal rotates one turn.

The phase comparator 16 determines a difference $\Delta\theta$ ($\Delta\theta=\theta_a-\theta_b$) between the angle $\theta_a$ of the Lissajous signal supplied from the first phase detector 14 and the angle $\theta_b$ of the Lissajous signal supplied from the second phase detector 15. The difference $\Delta\theta$ varies as the scale 12 is displaced, and will be back to the initial value when the scale 12 is displaced $\Lambda(1+n)/4$ in a predetermined measuring direction.

The phase comparator 16 supplies the difference $\Delta\theta$ to the pulse signal generator 17. When the difference $\Delta\theta$ supplied from the phase comparator 16 takes a predetermined value difference $\Delta\theta_c$, the pulse signal generator 17 produces a pulse signal and supplies it to the origin signal selector 18. For example, in case the difference $\Delta\theta$ takes the initial value each time the scale 12 is displaced $\Lambda(1+n)/4$ in the predetermined measuring direction, the pulse signal generator 17 will produce a pulse signal at every $\Lambda(1+n)/4$.

Also, the pulse signal generator 17 can arbitrarily set the above value $\Delta\theta_c$ (will be referred to as "setting" hereinafter). With a setting of zero degree which can easily be detected, for example, the pulse signal generator 17 will produce a pulse signal when the difference $\Delta\theta$ supplied from the phase comparator 16 is zero degree.

Further, since the pulse signal generator 17 produces a pulse signal at a predetermined interval unless the distance between the first and second optical systems 10 and 11 and that between the first and second areas 12a and 12b on the scale 12 vary, so it will be able to use the pulse signal as an origin signal. Also, the interval at which the origin signal is produced can be set arbitrarily according to a difference $\Lambda/n$ between a pitch of the diffraction gratings recorded in the first area 12a and a pitch of the diffraction gratings recorded in the second area 12b.

The resolution of the pulse signal produced by the pulse signal generator 17 will be discussed below. Since the period of the pulse signal should be longer for use of the pulse signal as an origin signal, the value n should be larger.

However, since a phase difference is of only Λ/4n at a point the Lissajous reaches having made a round from a point where two phase differences coincide with each other, a detected position will be Λ/4 off a correct one if the coincidence cannot be detected with a better accuracy than Λ/4n. The resolution of detecting two phase differences depends upon an accuracy of reading the two phase differences and a signal-to-noise (S/N) ratio, which will result in a limitation of the magnitude of the value n.

On the assumption that in the displacement pickup 1, the grating pitch is 0.55 μm and n is 100, for example, the origin of repetition will appear at every about 13.9 μm. At this time, when the resolution is Λ/4n, the value n has to be at least 200 to 400. Namely, the resolution should be as high as possible. For example, when n=100, the phase difference is only 2π/100 even with a displacement of Λ/4, and so the distance with which the phase difference is within the resolution margin will have a margin of Λ/4. To reduce this margin, the resolution has to be increased. In case n=1000, the distance margin will be Λ/(4×10).

However, the resolution cannot easily be increased because of the S/N ratio. On this account, it will be an effective measure to select, as a gate, one waveform (Λ/4) of a signal with which the coincidence between phase differences is detected, and produce an origin signal when the phase of one signal form which the margin of Λ/4 is determined is a predetermined one. Thereby, the origin accuracy and resolution can be increased up to a phase difference detecting resolution. It should be noted that in this embodiment, the origin accuracy can be increased up to 0.3 to 0.7 nm.

Also, the pulse signal generator 17 may be designed so that the user can change the setting after the displacement pickup 1 is installed to an object apparatus. It should be noted that in this case, the setting may initially be an appropriate one and a program for changing the setting is distributed to the user upon inquiry from the user.

Also, the pulse signal generator 17 may be designed to count times when the difference Δθ supplied from the phase comparator 16 has arrived at the setting and produce a pulse signal when the count of times has taken a predetermined value.

Further the pulse signal generator 17 may be adapted to produce an origin signal when the angle $\theta_a$ of a Lissajous signal produced by the first phase detector 14 (will be referred to as "angle $\theta_a$" hereinafter), or the angle $\theta_b$ of a Lissajous signal produced by the second phase detector 15 (will be referred to as "angle $\theta_b$" hereinafter), arrives at an arbitrary angle $\theta_n$ after the difference Δθ has arrived at the setting. Also, the pulse signal generator 17 may be designed to produce an origin signal when the angle $\theta_a$ or $\theta_b$ arrives at an arbitrary angle $\theta_n$ reappearing in a position apart a predetermined distance from a position where it has arrived at the arbitrary angle $\theta_n$ once after arrival of the difference Δθ at the setting. It should be noted that the predetermined distance is (2n+1)Λ/2 where n is an integer larger than zero and Λ is a pitch with which the diffraction gratings are recorded in the first area 12a in case the pulse signal generator 17 is to use the first area 12a on the scale 12 for production of an origin signal or a pitch with which the diffraction gratings are recorded in the second area 12b on the scale 12 in case the pulse signal generator 17 is to use the second area 12b for production of an origin signal.

Note that the pulse signal generator 17 may be designed so that the user can change the arbitrary angle $\theta_n$ after the displacement pickup 1 is installed to an object apparatus. In this case, the arbitrary angle $\theta_n$ may initially be an appropriate one and a program for changing the arbitrary angle $\theta_n$ is distributed to the user upon inquiry from the user.

Using the incremental signal supplied from the incremental signal generator 13, the origin signal selector 18 selects, as an origin signal, an arbitrary one of a pulse signals supplied from the pulse signal generator 17. The pulse signal generator 17 produces a pulse signal according to a recording pattern of diffraction gratings formed in the second area 12b on the scale 12 and provides it to the origin signal selector 18 which in turn will be able to select an arbitrary pulse signal by counting the interval between the supplied pulse signals and number of the supplied pulse signals. The displacement pickup 1 selects an origin signal according to the recording pattern of diffraction gratings formed in the second area 12b as will be explained below.

Figure 3A:
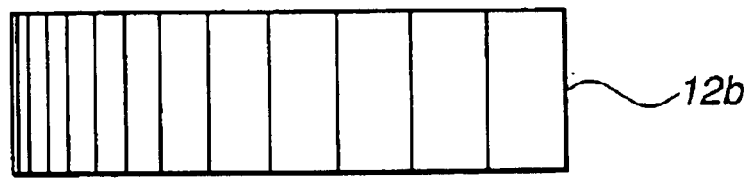
Figure 3B:
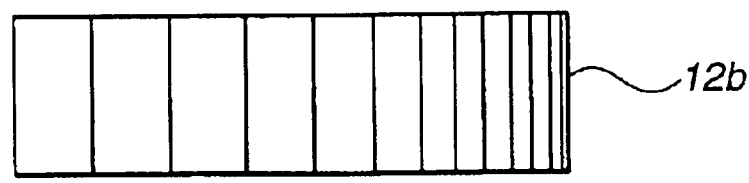

As shown in FIGS. 3A and 3B, the grating pitch is changed by linearly increasing or decreasing the number n (n=100+x/10, for example; x is a variable) in the pitch (Λ+Λ/n) of the diffraction gratings formed in the second area 12b.

In the second optical system 11, the result of reading from the second area 12b where the diffraction gratings are recorded as above is supplied to the second phase detector 15. Based on the signal supplied from the second optical system 11, the second phase detector 15 determines an angle $\theta_b$ of Lissajous signal and supplies the angle $\theta_b$ to the phase detector 16. It should be noted that the turning speed of an angle detected by the second phase detector 15 is not constant in the measuring direction but increased or decreased correspondingly to the pitch of the diffraction gratings recorded in the second area 12b.

The phase comparator 16 determines a difference Δθ between the angle $\theta_a$ of the Lissajous signal supplied from the first phase detector 14 and angle $\theta_b$ of the Lissajous signal supplied from the second phase detector 15, and supplies the difference Δθ to the pulse signal generator 17. The pulse signal generator 17 produces a pulse signal when the supplied difference Δθ takes a predetermined value $\Delta\theta_c$, and supplies the pulse signal to the origin signal selector 18. It should be noted that the pulse signal generator 17 will not produce a pulse signal in a constant timing since the time when the difference Δθ takes the value $\Delta\theta_c$ depends upon the value of the number n in the interval Λ(1+n)/4 at which a pulse signal is produced.

The origin signal selector 18 can measure the interval between the pulse signals supplied from the pulse signal generator 17 by counting the interval between the pulse signals on the basis of the incremental signal supplied from the incremental signal generator 13. On this account, it is assumed that an address when the number n in the interval Λ(1+n)/4 is 100 is "1", an address when the number n is 110 is "2", an address when the number n is 120 is "3", . . . , for example. By designating an address and measuring the interval of pulse signals supplied from the pulse signal generator 17 sequentially on the basis of the incremental signal to detect an address, the origin signal selector 18 can select, when having detected the designated address, a pulse signal appearing next as an origin signal.

In the displacement pickup 1 constructed as above, the scale 12 has formed on one side thereof with respect to a measuring direction the first area 12a where the diffraction gratings are recorded with the pitch Λ and on the other side the second area 12b where the diffraction gratings are recorded with the pitch Λ+Λ/n (n shifts a predetermined extent in the measuring direction). The first and second optical systems 10 and 11 emit light beams centrosymmetrically to the scale 12 so that the incident light beams are diffracted at points disposed in line with each other on the diffraction gratings. The light beams thus diffracted by the diffraction gratings interfere with each other. Each of the first and second phase detectors 14 and 15 detects a phase difference between the light beams interfering with each other, and the phase comparator 16 detects a difference between the phase differences, the pulse signal generator 17 produces a pulse signal when the difference takes the predetermined value, and the origin signal selector 18 can measure the interval between the pulse signals by counting the interval between the pulse signals supplied from the pulse signal generator 17 on the basis of the incremental signal supplied from the incremental signal generator 13. Thus, the origin signal selector 18 can select an arbitrary one of the plurality of pulse signals supplied from the pulse signal generator 17 as an origin signal.

Further, since the first and second optical systems 10 and 11 used in the displacement pickup 1 are of a grating interferometer type, so the diffraction gratings can be recorded with smaller pitches in the first and seconds areas 12a and 12b, respectively, defined on the scale 12. For example, when the grating pitch is 0.55 μm, the signal for detection of a phase will have a period of 0.1379 . . . μm (about 138 nm). Thus, it is possible to detect a phase difference with a high accuracy, select an origin signal with an accuracy in the order of nanometers and thus select, as an origin signal, an arbitrary one of the plurality of origin signals selected with the accuracy in the order of nanometers.

Figure 4:
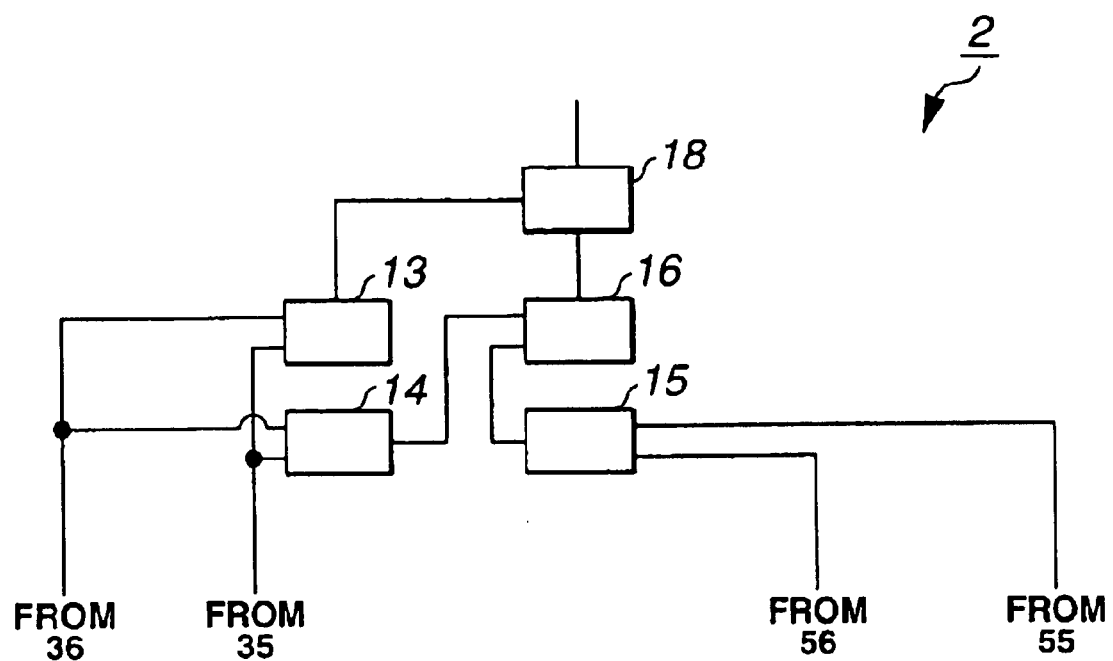
FIG. 4 is a block diagram of a second embodiment of the displacement pickup according to the present invention.

Also, the present invention is also applicable to a displacement pickup constructed as shown in FIG. 4. The displacement pickup is generally indicated with a reference number 2. The same or similar components included in the displacement pickup 2 as or to those in the aforementioned displacement pickup 1 will be indicated with the same or similar reference numbers as or to those used in illustration or explanation of the displacement pickup 1, and will not be described in detail any longer. The first and second optical systems 10 and 11 shown in FIG. 4 are constructed similarly to those in the displacement pickup 1 shown in FIG. 1, and thus the explanation thereof will be omitted.

In the displacement pickup 2, the incremental signal generator 13 and phase comparator 16 are connected to the origin signal selector 18 as shown in FIG. 4. In this embodiment, the origin signal selector 18 selects an arbitrary signal as an origin signal on the basis of an incremental signal supplied from the incremental signal generator 13 and a variation of a difference Δθ supplied from the phase comparator 16.

Figure 5:
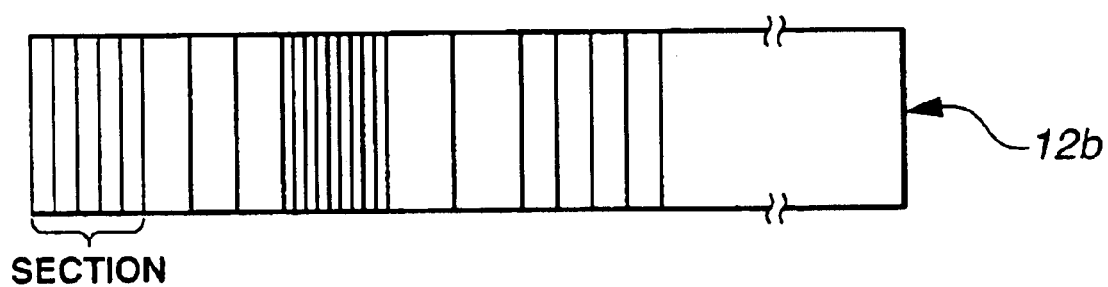
FIG. 5 schematically illustrates a second pattern of diffraction gratings recorded in a second area on a scale on which the displacement pickup in FIG. 4 detects an origin signal.

The displacement pickup 2 provides an arbitrary origin signal with the use of a scale having defined thereon a second area 12b having repeatedly recorded therein in the measuring direction a pattern having laid at random at least two sections, one of which has diffraction gratings recorded with one pitch (Λ+Λ/n) (namely, n takes one value) and while the other, adjacent to the one section, of which has diffraction gratings recorded therein with a pitch (Λ+Λ/n) different from the one pitch (namely, n takes another value), as shown in FIG. 5. The displacement pickup 2 operates to select an origin signal according to a recording pattern of diffraction gratings formed in the second area 12b as will be described below. It should be noted that in the second area 12b, the one pattern may not be recorded repeatedly but sections different in value of n from each other may be recorded at random in the measuring direction.

In the second optical system 11, the result of reading from the second area 12b where the diffraction gratings are recorded as above is supplied to the second phase detector 15. Based on the signal supplied from the second optical system 11, the second phase detector 15 determines an angle $\theta_b$ of Lissajous signal and supplies the angle $\theta_b$ to the phase detector 16. It should be noted that the turning speed of an angle detected by the second phase detector 15 is not constant in the measuring direction but varies from one section to another when the object section the second optical system 11 is going to read changes from one to another in the second area 12b.

The phase comparator 16 determines a difference Δθ between the angle $\theta_a$ (the turning speed is constant) of the Lissajous signal supplied from the first phase detector 14 and angle $\theta_b$ (the turning angle is variable) of the Lissajous signal supplied from the second phase detector 15, and supplies the difference Δθ to the origin signal selector 18.

The origin signal selector 18 can detect a change of the difference Δθ by monitoring the differences Δθ before and after the difference Δθ in question, supplied from the phase comparator 16. Therefore, the origin signal selector 18 can arbitrarily designate a change of the difference Δθ in advance and select a next appearing signal as an origin signal when it detects that designated change of the difference Δθ.

Figure 6:
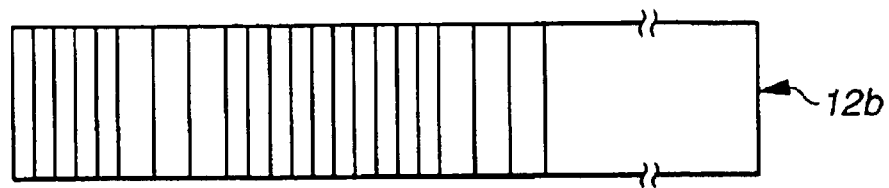
FIG. 6 schematically illustrates a third pattern of diffraction gratings recorded in the second area on the scale on which the displacement pickup in FIG. 4 detects an origin signal.

Also, the displacement pickup 2 provides an arbitrary origin signal with the use of a scale having defined thereon a second area 12b having recorded therein in a predetermined sequence in the measuring direction two types of sections, one of which has diffraction gratings recorded therein with one pitch (Λ+Λ/n) (namely, n takes one value) while the other has diffraction gratings recorded with another pitch (namely, n takes another value), as shown in FIG. 6. For example, the second area 12b has the two types of sections in which n's are 100 and 130, respectively and which are laid in the predetermined sequence in the measuring direction.

In this case, the second optical system 11 reads diffraction gratings over a predetermined distance (5 sections, for example) in the second area 12b, and supplies a result of reading to the second phase detector 15. Based on the signal supplied from the second optical system 11, the second phase detector 15 determines an angle $\theta_b$ of Lissajous signal and supplies the angle $\theta_b$ to the phase detector 16. It should be noted that the turning speed of an angle detected by the second phase detector 15 is not constant in the measuring direction but varies from one section to another recorded in the second area 12b. That is, the turning speed of the phase of a section in which n is 100 is different from that of a section in which n is 130.

The phase comparator 16 determines a difference Δθ between the angle $\theta_a$ (the turning speed is constant) of the Lissajous signal supplied from the first phase detector 14 and angle $\theta_b$ (the turning angle is variable) of the Lissajous signal supplied from the second phase detector 15, and supplies the difference Δθ to the origin signal selector 18.

The origin signal selector 18 can detect two kinds of changes of the difference Δθ by monitoring successive differences supplied from the phase comparator 16. Based on the difference between the two kinds of changes, the origin signal selector 18 digitizes a detected change of difference Δθ taking, as "1", a change of the difference Δθ when there is detected one section in which n is 100 and, as "0", a change of the difference Δθ when there is detected another section in which n is 130. Therefore, the origin signal selector 18 can designate "10101" in advance and select a next appearing signal as an origin signal when the detected change of difference Δθ takes the designated value. It should be noted that the distance over which the second optical system 11 reads diffraction gratings in the second area 12b may not be five sections.

Figure 7:
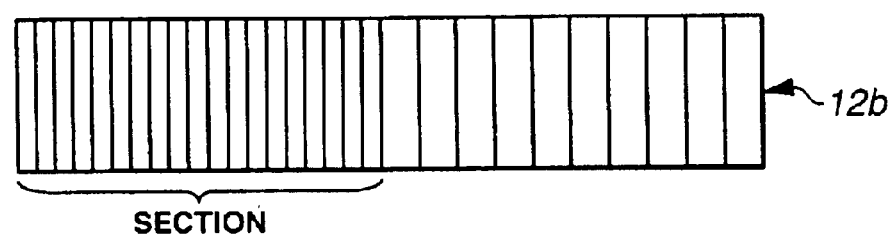
FIG. 7 schematically illustrates a fourth pattern of diffraction gratings recorded in the second area on the scale on which the displacement pickup in FIG. 4 detects an origin signal.

Also, the displacement pickup 2 provides an arbitrary origin signal with the use of a scale having defined thereon the second area 12b consisting of two sections, one of which has diffraction gratings recorded with one pitch (Λ+Λ/n) (namely, n takes one value) while the other, adjacent to the one section, has diffraction gratings recorded with another pitch (Λ+Λ/n) (namely, n takes a value other than in the one section), as shown in FIG. 7. For example, in the second area 12b, two types of sections, in one of which n is 100 while in the other, n is 130, are laid in the measuring direction.

In this case, the second optical system 11 reads diffraction gratings from the second area 12b, and supplies a result of reading to the second phase detector 15. Based on the signal supplied from the second optical system 11, the second phase detector 15 determines an angle $\theta_b$ of Lissajous signal, and supplies the angle $\theta_b$ to the phase detector 16. It should be noted that the turning speed of an angle detected by the second phase detector 15 varies from one section to another in the measuring direction. That is, the turning speed of the phase of a section in which n is 100 is different from that of a section in which n is 130.

The phase comparator 16 determines a difference Δθ between the angle $\theta_a$ (the turning speed is constant) of the Lissajous signal supplied from the first phase detector 14 and angle $\theta_b$ (the turning angle is variable) of the Lissajous signal supplied from the second phase detector 15, and supplies the difference Δθ to the origin signal selector 18.

The origin signal selector 18 can detect a change from one difference Δθ to another by monitoring successive differences Δθ supplied from the phase comparator 16. Based on the difference between the two kinds of changes, the origin signal selector 18 can determine a boundary between a section in the second area 12b, in which n is 100 and a section in which n is 130. The origin signal selector 18 can select a next appearing signal as an origin signal by detecting the boundary between the sections.

In the displacement pickup 2 constructed as above, a scale 12, having defined on one side thereof in relation to the measuring direction a first area 12a in which diffraction gratings are recorded with one pitch Λ and on the other side a second area 12b having diffraction gratings recorded with a pitch (Λ+Λ/n) (namely, n takes one value) in the same section, with the grating pitches (Λ+Λ/n) used in adjacent sections being different from each other (namely, n is different from one section to another), is illuminated with light beams emitted from the first and second optical systems 10 and 11 centrosymmetrically such that the diffraction points upon which the light beams are incident are in line with each other to put the light beams diffracted by the diffraction gratings into interference with each other, phase differences are detected by the first and second phase detectors 14 and 15 from the interference light beams, respectively, a difference between the phase differences is detected by the phase comparator 16, and the difference between the successive phase differences supplied from the phase comparator 16 is monitored by the origin signal selector 18 to detect a change of the difference, whereby an arbitrary signal can be selected as an origin signal on the basis of the change.

Further, since the first and second optical systems 10 and 11 used in the displacement pickup 2 are of a grating interferometer type, so the diffraction gratings can be recorded with smaller pitches in the first and second areas 12a and 12b, respectively, defined on the scale 12. For example, when the grating pitch is 0.55 μm, the signal for detection of a phase will have a period of 0.1379 . . . μm (about 138 nm). Thus, it is possible to detect a phase difference with a high accuracy, select an origin signal with an accuracy in the order of nanometers and thus select, as an origin signal, an arbitrary one of the plurality of origin signals selected with the accuracy in the order of nanometers.

Figure 8:
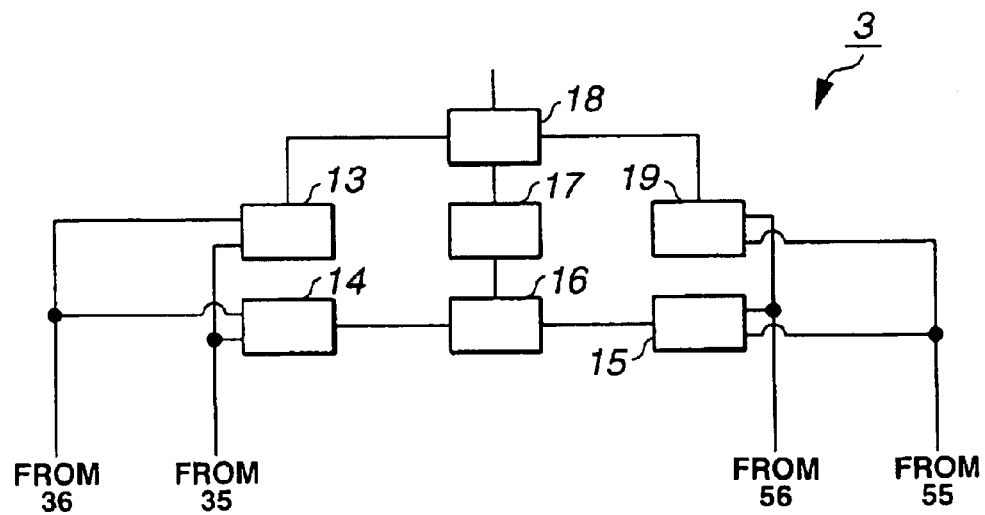
FIG. 8 is a block diagram of a third embodiment of the displacement pickup according to the present invention.
Figure 9:
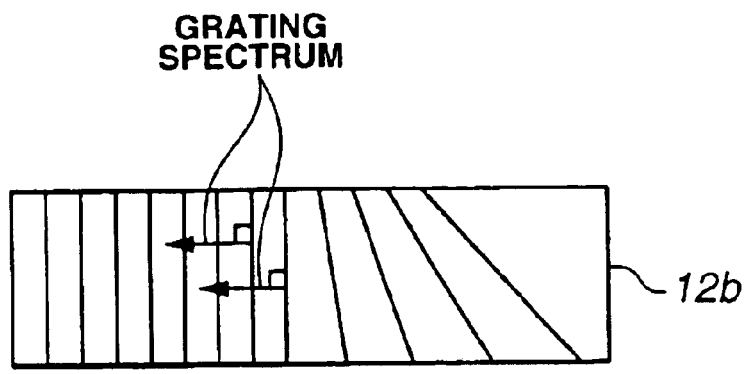
FIG. 9 schematically illustrates a fifth pattern of diffraction gratings recorded in the second area on the scale on which the displacement pickup in FIG. 8 detects an origin signal.

Also, the present invention is also applicable to a displacement pickup constructed as shown in FIG. 8. The displacement pickup is generally indicated with a reference number 3. The same or similar components included in the displacement pickup 3 as or to those in the aforementioned displacement pickup 1 will be indicated with the same or similar reference numbers as or to those used in illustration or explanation of the displacement pickups 1 and 2, and will not be described in detail any longer. The first and second optical systems 10 and 11 shown in FIG. 8 are constructed similarly to those in the displacement pickup 1 shown in FIG. 1, and thus the explanation thereof will be omitted.

As shown in FIG. 8, the displacement pickup 3 includes an amplitude signal output unit 19 which produces an amplitude signal correspondingly to a signal read from a second scale 12b on a scale 12 on the basis of a signal supplied from first and second differential amplifiers 55 and 56 and provides it to an origin signal selector 18. To this origin signal selector 18, there are connected an incremental signal generator 13, pulse signal generator 17 and amplitude signal output unit 19. In this embodiment, the origin signal selector 18 selects, as an origin signal, an arbitrary one of an incremental signal supplied from the incremental signal generator 13 and a change of a difference Δθ supplied from a phase comparator 16 according to the amplitude signal supplied from the amplitude signal output unit 19.

In the above displacement pickup 3, the diffraction degree n of the pitch (Λ+Λ/n) between diffraction gratings recorded in the second area 12b is shifted a predetermined extent in the measuring order to vary the grating pitch in order to increase or decrease the amplitude of an output signal from the second optical system 11, the increase or decrease of the amplitude is detected by the amplitude signal output unit 19, and an arbitrary signal is selected as an origin signal by the origin signal selector 18 according to the amplitude signal indicating the increase or decrease of the amplitude, as shown in FIGS. 3A and 3B and FIG. 5.

On the assumption that the wavelength of a light beam from a coherent light source 40 is 780 nm and a light beam is emitted from the coherent light source 40 for incidence upon a first lens 41 at an angle of 45 deg., the incident light is diffracted as given by the following equation, and then reflected by a reflection prism 44 to travel along the same optical path and return to a first PBS 42:

$$\sin \theta_1 + \sin \theta_2 = n \cdot \lambda / \Lambda$$

where $\theta_1$ indicates an angle of incidence upon the scale 12, $\theta_2$ indicates an angle of diffraction from the scale 12, Λ indicates a pitch (width) of the gratings, λ indicates the wavelength of the light beam, and n indicates a degree of diffraction as shown in FIG. 1.

As the grating pitch Λ varies, however, the diffraction angle $\theta_2$ also varies so that the incident beam from the coherent light source 40 will be repelled, so-called "eclipsed", to a reflection prism 44 and pinhole 57. Thus, the amount of the return light having traveled along the same optical path back to the first PBS 42 will be small. With such reduced light amount, the interference signal provided by first, second, third and fourth photoelectric transducers 49, 50, 53 and 54 will be lower in level. The first and second differential amplifiers 55 and 56 make differential amplification of a signal correspondingly to the level of the supplied interference signal, and provide the amplitude signal output unit 19 with the signal from which DC component has been canceled. The amplitude signal output unit 19 produces an amplitude signal on the basis of the magnitude of the supplied signal, and provides the amplitude signal to the origin signal selector 18.

According to the amplitude signal supplied from the amplitude signal output unit 19, the origin signal selector 18 selects, as an origin signal, an arbitrary one of a plurality of pulse signals supplied from the pulse signal generator 17 with the use of an incremental signal supplied from the incremental signal generator 13. The origin signal selector 18 forms an amplitude waveform from the amplitude signal supplied from the amplitude signal output unit 19, and selects, an origin signal, a signal appearing next to a peak amplitude (maximum voltage) in case the gradient of the amplitude waveform is steep, or a signal appearing after the amplitude waveform arrives at a predetermined amplitude in case the amplitude waveform gradient is gentle.

Figure 10A:
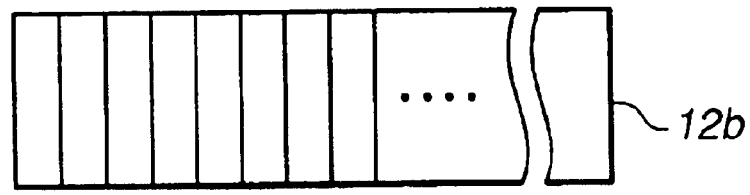
Figure 10B:
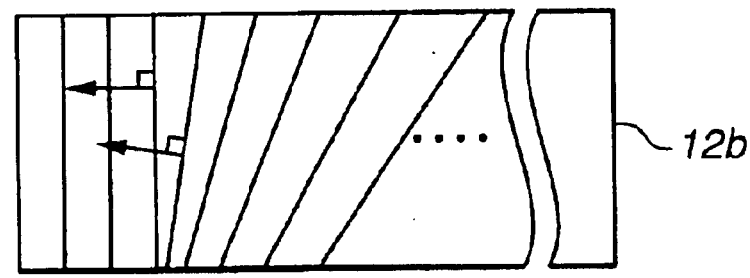
Figure 11:
FIG. 11 is a side elevation schematically showing a second area formed from a brazed hologram.

Also, in the displacement pickup 3, an arbitrary origin signal is selected with the use of a second area 12b having recorded therein diffraction gratings having the vector direction thereof displaced a predetermined extent in the measuring direction as shown in FIGS. 9, 10A and 10B and 11. In the second area 12b shown in FIG. 9, the vector of the diffraction gratings is displaced in the measuring direction in a view from above. The second area 12b whose top plan view and side elevation are illustrated in FIGS. 10A and 10B, respectively, is formed from a volume hologram in which the vector of the diffraction gratings is displaced in the direction of volume (side), and the second area 12b shown in FIG. 11 is formed from a brazed hologram in which the grating vector is displaced by varying the surface angle. When light is incident upon an area where the grating vector is displaced as above, diffracted light beams will have the optical axes thereof misaligned with each other and thus the visibility thereof reduced.

Therefore, the incident beam from the coherent light source 40 will be repelled, so-called "eclipsed", to a reflection prism 44 and pinhole 57. Thus, the amount of the return light having traveled along the same optical path back to the first PBS 42 will be small. With such reduced light amount, the interference signal provided by first, second, third and fourth photoelectric transducers 49, 50, 53 and 54 will be lower in level. The first and second differential amplifiers 55 and 56 make differential amplification of a signal correspondingly to the level of the supplied interference signal, and provide the amplitude signal output unit 19 with the signal from which DC component has been canceled. The amplitude signal output unit 19 produces an amplitude signal on the basis of the magnitude of the supplied signal, and provides the amplitude signal to the origin signal selector 18.

According to the amplitude signal supplied from the amplitude signal output unit 19, the origin signal selector 18 selects, as an origin signal, an arbitrary one of a plurality of pulse signals supplied from the pulse signal generator 17 with the use of an incremental signal supplied from the incremental signal generator 13. The origin signal selector 18 forms an amplitude waveform from the amplitude signal supplied from the amplitude signal output unit 19, and selects, an origin signal, a signal appearing next to a peak amplitude (maximum voltage) in case the gradient of the amplitude waveform is steep, or a signal appearing after the amplitude waveform arrives at a predetermined amplitude in case the amplitude waveform gradient is gentle.

Figure 12:
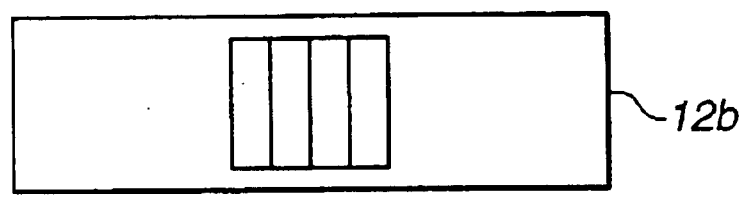
FIG. 12 schematically illustrates a sixth pattern of diffraction gratings recorded in the second area on the scale on which the displacement pickup in FIG. 8 detects an origin signal.
Figure 13:
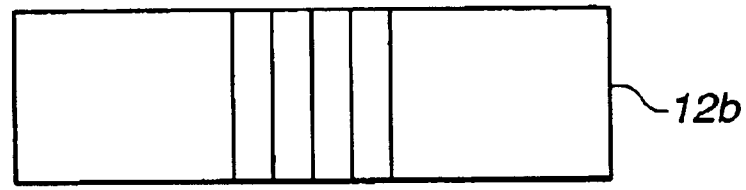
FIG. 13 schematically illustrates a second area from which all diffraction gratings recorded in other than a specific range are physically eliminated.
Figure 14:
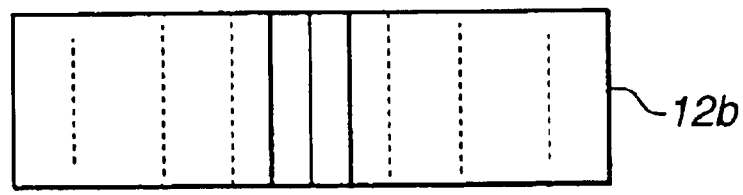
FIG. 14 schematically illustrates a second area having placed on diffraction gratings recorded therein a glass cover whose transmittance varies from one portion to another thereof.

Also, in the displacement pickup 3, an arbitrary origin signal is selected with the use of each of second areas 12b processed in a predetermined manner as shown in FIGS. 12, 13 and 14. FIG. 12 shows a second area 12b in which there is defined a specific range and diffraction gratings recorded in other than the specific range are masked so that only the diffraction gratings can be read. In the displacement pickup 3, since the diffraction gratings are read from the range not masked in the second area 12b, it is possible to limit the number of origin signals produced.

Also, FIG. 13 shows a second area 12b in which there is defined a specific range and all diffraction gratings recorded in other than the specific range are physically eliminated. In the displacement pickup 3, since the diffraction gratings are read from the range in the second area 12b from which no diffraction gratings are removed, it is possible to limit the number of origin signals produced.

Further, FIG. 14 shows a second area 12b having placed on diffraction gratings recorded therein a glass cover whose transmittance varies from one portion to another thereof for the transmittance of a specific range to be different from that of other than the specific range. In this displacement pickup 3, a difference in transmittance is detected in the second area 12b and a signal appearing after a predetermined transmittance is attained is selected as an origin signal.

In the displacement pickup 3 constructed as above, a scale 12, having defined on one side thereof in relation to the measuring direction a first area 12a in which diffraction gratings are recorded with one pitch $\Lambda$ and on the other side a second area 12b in which diffraction gratings are recorded with a pitch other than $\Lambda$ and the vector direction of the diffraction gratings is displaced in the measuring direction or a second area 12b in which diffraction gratings recorded with a pitch other than $\Lambda$ are processed in a predetermined manner, is illuminated with light beams emitted from the first and second optical systems 10 and 11 centrosymmetrically such that the diffraction points upon which the light beams are incident are in line with each other to put the light beams diffracted by the diffraction gratings into interference with each other, phase differences are detected by the first and second phase detectors 14 and 15 from the interference light beams, respectively, a difference between the phase differences is detected by the phase comparator 16, a pulse signal is produced by the pulse signal generator 17 when the difference takes a predetermined value, an interval between the pulse signals supplied from the pulse signal generator 17 by the origin signal generator 18 with the use of an incremental signal supplied from the incremental signal generator 13 and thus a signal falling within an arbitrary range of the interval can be selected as an origin signal by the origin signal generator 18 on the basis of an amplitude signal supplied from the amplitude signal output unit 19.

Further, since the first and second optical systems 10 and 11 used in the displacement pickup 3 are of a grating interferometer type, so the diffraction gratings can be recorded with smaller pitches in the first and seconds areas 12a and 12b, respectively, defined on the scale 12. For example, when the grating pitch is 0.55 $\mu$m, the signal for detection of a phase will have a period of 0.1379 . . . $\mu$m (about 138 nm). Thus, it is possible to detect a phase difference with a high accuracy, select an origin signal with an accuracy in the order of nanometers and thus select, as an origin signal, an arbitrary one of the plurality of origin signals selected with the accuracy in the order of nanometers.

Also, in the aforementioned first to third displacement pickups 1 to 3, the coherent light source 20 and first lens 21, and the second lens 26 and BS 27, included in the first optical system 10, and the coherent light source 40 and first lens 41, and the second lens 46 and BS 47, included in the second optical system 11, may be connected, to each other, with optical fibers, respectively.

Also, the second BS P28 and first photoelectric transducer 29, the second PBS 28 and second photoelectric transducer 30, the third PBS 32 and third photoelectric transducer 33, the third PBS 32 and fourth photoelectric transducer 34, the second PBS 48 and first photoelectric transducer 49, the second PBS 48 and second photoelectric transducer 50, the third PBS 52 and third photoelectric transducer 53, and the third PBS 52 and fourth photoelectric transducer 54, may be connected, to each other, with optical fibers, respectively, instead of connecting the second lens 26 and BS 27 and the second lens 46 and BS 47, to each other, with optical fibers, respectively.

Note that to condense rays of light from the second PBS 28 for incidence upon the optical fiber, condenser lenses may be disposed between the second PBS 28 and first photoelectric transducer 29, and between the second PBS 28 and second photoelectric transducer 30, respectively; to condense rays of light from the third PBS 32 for incidence upon the optical fiber, condenser lenses may be disposed between the third PBS 32 and third photoelectric transducer 33, and between the third PBS 32 and fourth photoelectric transducer 34, respectively; to condense rays of light from the second PBS 48 for incidence upon the optical fiber, condenser lenses may be disposed between the second PBS 48 and first photoelectric transducer 49, and between the second PBS 48 and second photoelectric transducer 50, respectively; and to condense rays of light from the third PBS 52 for incidence upon the optical fiber, condenser lenses may be disposed between the third PBS 52 and third photoelectric transducer 53, and between the third PBS 52 and fourth photoelectric transducer 54.

In the above construction of the displacement pickups 1 to 3, keeping the heat source away from the scale 12 to enable a stabler phase detection, and thermal control of the wavelength of light beams emitted from the coherent light sources 20 and 40 can provide a light beam having a constant wavelength. By disposing the coherent light sources 20 and 40 outside the displacement pickup 1, it is possible to easily replace the light sources 20 and 40 when they become faulty.

Also, in the displacement pickups 1 to 3, the scale 12 may have the second area 12b thereof defined across the first area 12a. It should be noted that the first and second areas 12a and 12b may be defined on the same scale or separate scales, respectively. In the latter case, the scales should be fixed on the same base and formed so that they can be displaced equally in the same direction.

Also, in the displacement pickups 1 to 3, the scale 12 may have the first and second areas 12a and 12b superposed one on the other thereon in a direction perpendicular to the measuring direction.

In case the scale 12 is formed as above, the coherent light sources 20 and 40, and the first and second PBSs 22 and 42 may be used in common to the first and second optical systems 10 and 11 in the displacement pickups 1 to 3. Thus, even if the light emitted from a coherent light source 60 varies due to a deterioration with time or change of the outside air temperature, the symmetry of the optical paths will not adversely be affected, which assures to provide a stable origin signal. Further, with the scale 12 being formed as above, COS error will not cause the origin position to drift even when the scale 12 is rotated in the azimuth direction.

Also, the displacement pickups 1 to 3 employ the scale having linear transparent diffraction gratings recorded thereon, but the scale 12 may be of a radial type used in a rotary encoder or of a reflection type.

Also, the displacement pickups 1 to 3 may be constructed so that the optical systems are movable, not the scale.

Figure 15:
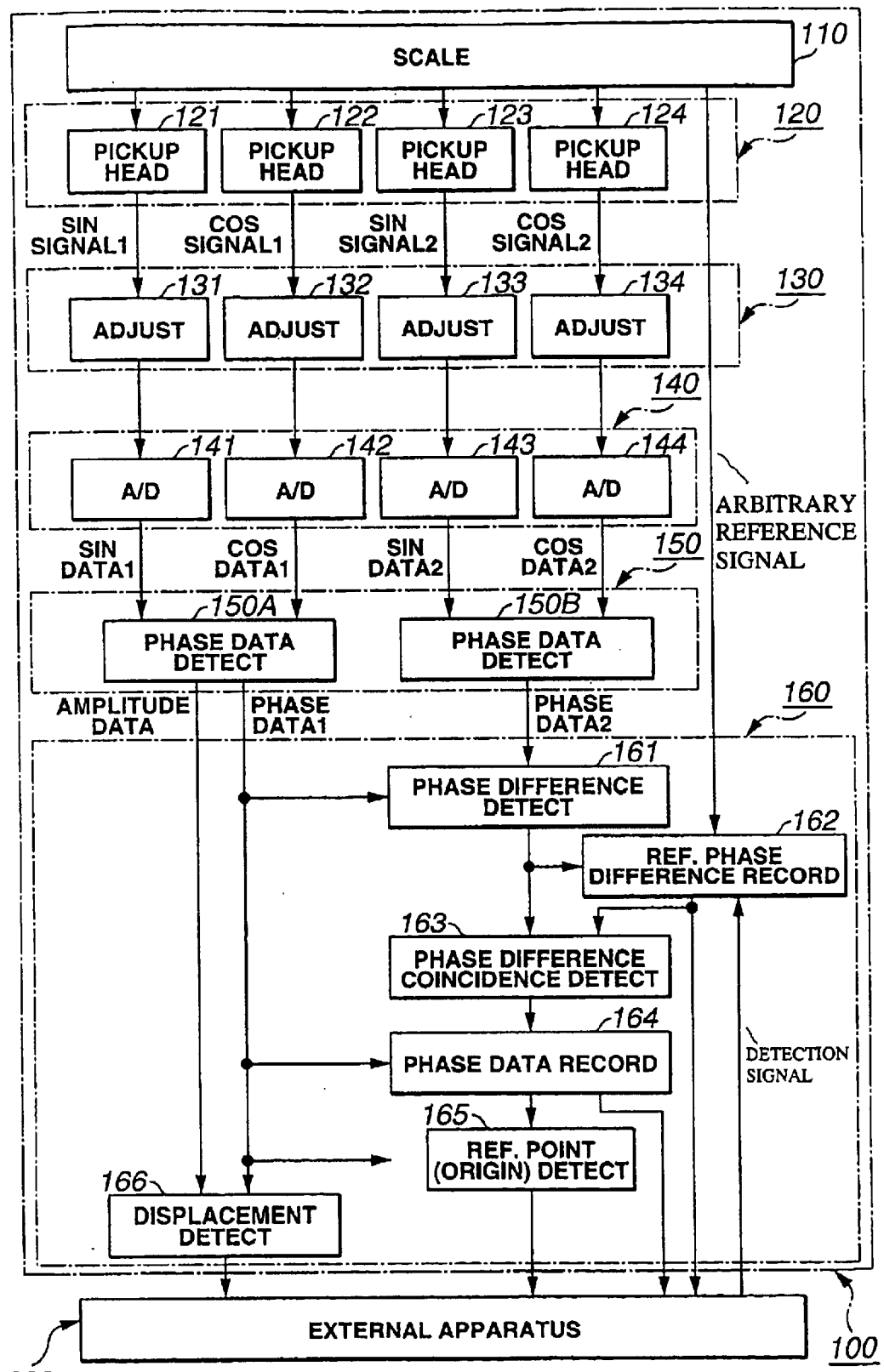
FIG. 15 is a block diagram of a fourth embodiment of the displacement pickup according to the present invention.

Further, the present invention is also applicable to a displacement pickup constructed as shown in FIG. 15. The displacement pickup is generally indicated with a reference number 100.

As shown, the displacement pickup 100 includes a scale 110, pickup head block 120, signal adjuster block 130, A-D converter block 140, phase date detector block 150, phase data processor 160, etc.

This displacement pickup 100 is destined for detection of a movement of two members, relative to each other, of a machine tool or the like to which it is to be installed. The scale 110 is fixed to a moving one, for example, of the two members, while the pickup head block 120 is fixed to the stationary one of the members.

The scale 110 is of a vernier scale type, and has recorded thereon two kinds of positional different in repetition pitch from each other and providing two kinds of phase information. In the displacement pickup 100, the pickup head block 120 detects the positional signals recorded on the scale 110 correspondingly to a movement of the moving member of a machine tool or the like, for example, and provides information on a position the moving member of the machine tool has reached. The displacement pickup 100 provides, as the positional information on the moving part of the machine tool, an incremental signal produced based on phase data, a point of coincidence in phase between arbitrary signals and a reference point (origin) produced from phase information in the incremental signal at a time of the selection. The positional information is transmitted to a controller or the like for use to control the operation of the machine tool.

As shown, the pickup head block 120 includes four pickup heads 121, 122, 123 and 124 which detect the positional signals recorded on the scale 110 and provides first to fourth position detection signals to the signal adjuster block 130. The first and second pickup heads 121 and 122 detect positional signals recorded with a first repetition pitch $\lambda_1$ on the scale 110 and provide first and second position detection signals (sin signal 1 and cos signal 1) between which there exists a phase difference of 90 deg. The first and second position detection signals are supplied to the signal adjuster block 130. Also, the third and fourth pickup heads 123 and 124 detect positional signals recorded with a second repetition pitch $\lambda_2$ on the scale 110 and provide third and fourth position detection signals (sin signal 2 and sin signal 2) between which there exists a phase difference of 90 deg. The third and fourth position detection signals are supplied to the signal adjuster block 130.

If the first to fourth position detection signals (sin signal 1, cos signal 1, sin signal 2 and cos signal 2) from the pickup head block 120 include any error in offset and gain due to any external factor, the error will result in an error in a phase data processing which will be described in detail later. On this account, in this displacement pickup 100, first to fourth adjusters 131, 132, 133 and 134 included in the signal adjuster block 130 adjust the corresponding first to fourth position detection signals (sin signal 1, cos signal 1, cos signal 2 and cos signal 2) to arbitrary constant values, respectively. It should be noted that each of the first to fourth adjusters 131, 132, 133 and 134 adjusts the position detection signal through adjustment of the resistance by a variable resistor using an ordinary operational amplifier. This adjustment may be done by checking the input signal directly on an oscilloscope. Alternatively, the resistance of the variable resistor may automatically be adjusted on the basis of an error obtained by supplying an arbitrary reference voltage as a provisional input signal, supplying an digital data output of the A-D converter block to RAM, and calculating the difference between the reference voltage and digital data.

The A-D converter block 140 includes first to fourth A-D converters 141, 142, 143 and 144 which are supplied with the corresponding first to fourth position detection signals (sin signal 1, cos signal 1, sin signal 2 and cos signal 2), respectively, supplied from the pickup head block 120 via the first to fourth adjusters 131, 132, 133 and 134, respectively. The first A-D converter 141 converts the first position detection signal (sin signal 1) adjusted by the first adjuster 131 into digital data and supplies it to the phase data detector block 150. The second A-D converter 142 converts the second position detection signal (cos signal 1) adjusted by the second adjuster 132 into digital data and supplies it to the phase data detector block 150. The third A-D converter 143 converts the third position detection signal (sin signal 2) adjusted by the third adjuster 133 into digital data and supplies it to the phase data detector block 150. The fourth A-D converter 144 converts the fourth position detection signal (cos signal 2) adjusted by the fourth adjuster 134 into digital data and supplies it to the phase data detector block 150.

The first to fourth A-D converters 141, 142, 143 and 144 of the A-D converter block 140 have been supplied with a sampling clock from a clock generator (not shown). The sampling clock used in the A-D converter block 140 has also been supplied to the phase data detector block 150 and phase data processor 160. It is referred to as a reference clock. It should be noted that the sampling clock has a frequency sufficiently higher by the resolution of the first to fourth A-D converters 141, 142, 143 and 144 in the A-D converter block 140, namely, the quantization unit of A-D conversion, than a time required for the moving member of a machine tool, of which the position is to be detected. For example, if such a machine tool is specified to take at least 1 $\mu$sec for the moving member thereof to move over the quantization unit of A-D conversion, the sampling clock is sufficiently higher than the minimum required time.

The first to fourth A-D converters 141, 142, 143 and 144 in the A-D converter block 140 convert the first to fourth position detection signals (sin signal 1, cos signal 1, sin signal 2 and cos signal 2), respectively, into 10-bit digital data for example, and supply the digital to the phase data detector block 150. It should be noted that the digital data thus resulted from the digital conversion of the first to fourth position detection signals (sin signal 1 and cos signal 1, sin signal 2 and cos signal 2) will be referred to as first to fourth position detection data (sin data 1, cos data 1, sin data 2 and cos data 2), respectively, hereunder.

The phase data detector block 150 includes a first phase data detector 150A supplied with the first and second position detection data (sin data 1 and cos data 1), and a second phase data detector 150B supplied with the third and fourth position detection data (sin data 2 and cos data 2).

Each of the first and second phase data detectors 150A and 150B consists of a corrective calculation unit and polar coordinate transform unit. Since the processing of the first and second position detection data (sin data 1 and cos data 1) in the first phase data detector 105A is quite the same as that of the third and fourth position detection data (sin data 2 and cos data 2) in the second phase data detector 50B, the sin data 1 and sin data 2 will be referred to as "Sin data" and the cos data 1 and 2 be referred to as "Cos data" in the following explanation of the corrective calculation unit and polar coordinate transform unit.

The corrective calculation unit corrects the jitter, caused by external variation such as noise, of the Sin and Cos data as the digital data resulted from digitization of sine-wave signal within the range of a set value, and supplies the Sin and Cos data thus corrected to the polar coordinate transform unit.

The polar coordinate transform unit make polar coordinate conversion of the Sin and Cos data to produce amplitude and angle data indicating a movement of the scale 110 and pickup head block 120, relative to each other and within one wavelength $\lambda$ of the positional signals recorded on the scale 110.

Figure 16:
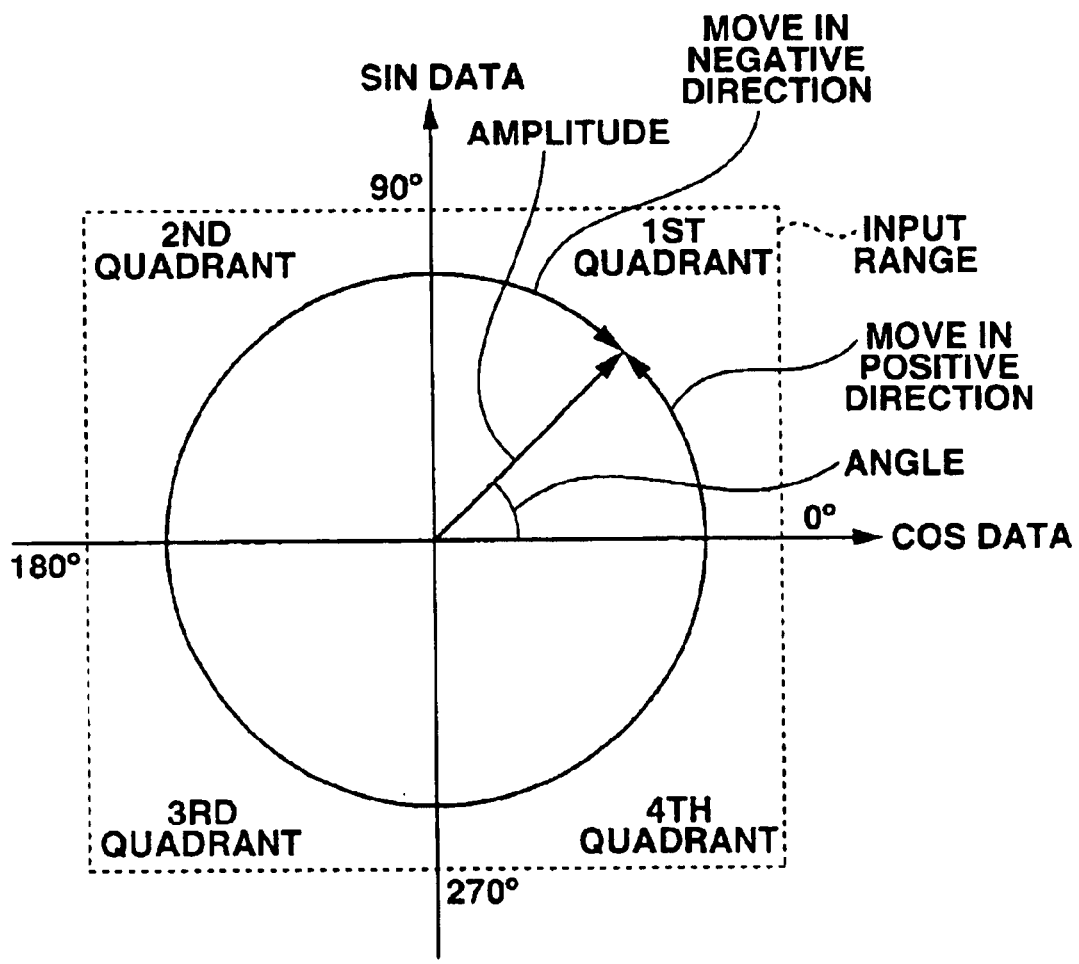
FIG. 16 explains Lissajous waveforms of sin and cos signals supplied from a pickup head block of the displacement pickup in FIG. 15.

More specifically, a vector depicted with the Cos data plotted along the horizontal axis and Sin data plotted along the vertical axis will have a Lissajous waveform which turns to the right or left depending upon the direction of a movement of the scale 110 and pickup head block 120, relative to each other, as shown in FIG. 16. As shown, one turn of the Lissajous waveform corresponds to one wavelength $\lambda$ of the positional signal, and the angle indicates an absolute position within the one wavelength of the positional signals. Thus, by making polar coordinate transform of the Sin and Cos data, it is possible to represent absolute positions of the scale 110 and pickup head block 120 within the one wavelength $\lambda$. That is, since the positional signals recorded on the scale 110 are periodic ones, angle data indicative of positional information within in one period can be produced by transforming the levels of the periodic signals into a polar coordinate.

Figure 17:
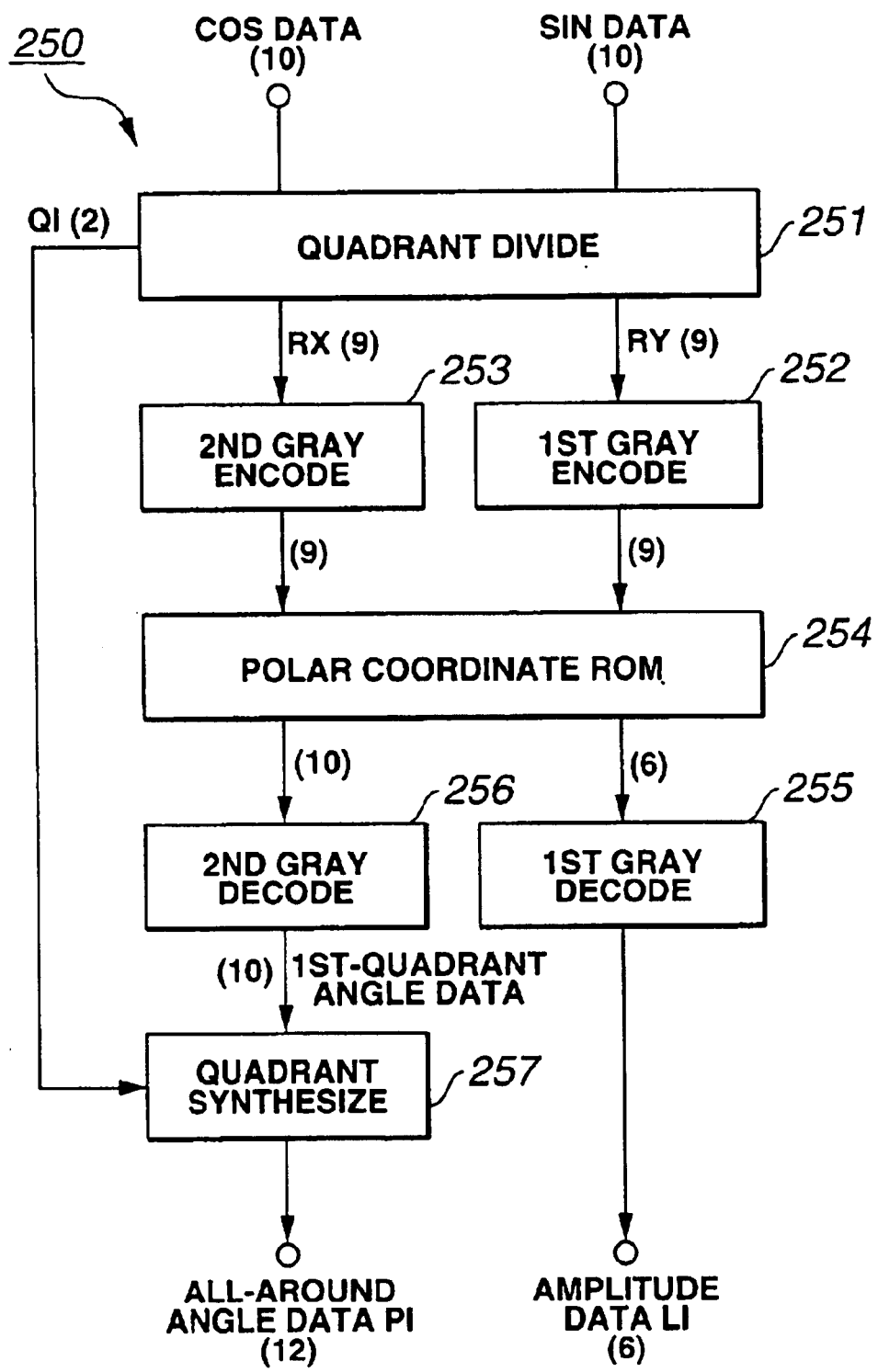
FIG. 17 is a block diagram of a polar coordinate transform unit included in a phase data detector in the displacement pickup in FIG. 15.

FIG. 17 is a block diagram of the polar coordinate transform unit. The polar coordinate transform unit will be described in detail herebelow:

As shown in FIG. 17, the polar coordinate transform unit indicated with a reference number 250 includes a quadrant divider 251, first and second gray encoders 252 and 253, polar coordinate ROM 254, first and second gray decoders 255 and 256, and a quadrant synthesizer 257.

The quadrant divider 251 is supplied with the Sin and Cos data each of 10 bits. The quadrant divider 251 divides the supplied data into 2 bit quadrant indicating data QI produced based on positive or negative sign appended to each of the Sin and Cos data (LSB sign, for example), first 9-bit quadrant Sin data RY resulted from conversion of Sin data in each quadrant into data corresponding to the first quadrant, and first 9-bit quadrant Cos data RX resulted from conversion of Cos data in each quadrant into data corresponding to the first quadrant. The quadrant divider 251 supplies the quadrant indicating data QI to the quadrant synthesizer 257, the first Sin data RY to the first gray encoder 252 and the first-quadrant Cos data RX to the second gray encoder 253.

The first gray encoder 252 makes gray coding of the first-quadrant Sin data RY into a gray code, and supplies the result to the polar coordinate ROM 254. The second gray encoder 253 make gray coding of the first Cos data RX and supplies the result to the polar coordinate ROM 254.

The polar coordinate ROM 254 has stored therein a polar coordinate transform table in which the gray-coded first-quadrant Sin data RY and Cos data RX are stated as addresses. The polar coordinate transform table has stated therein amplitude data LI and angle data PI of the first quadrant (0 to 90 deg.), corresponding to the gray-coded first Sin data RY and first Cos data RX. Each of the amplitude data LI and angle data PI of the first quadrant is stored in the gray-coded state in the polar coordinate ROM 254.

Figure 18:
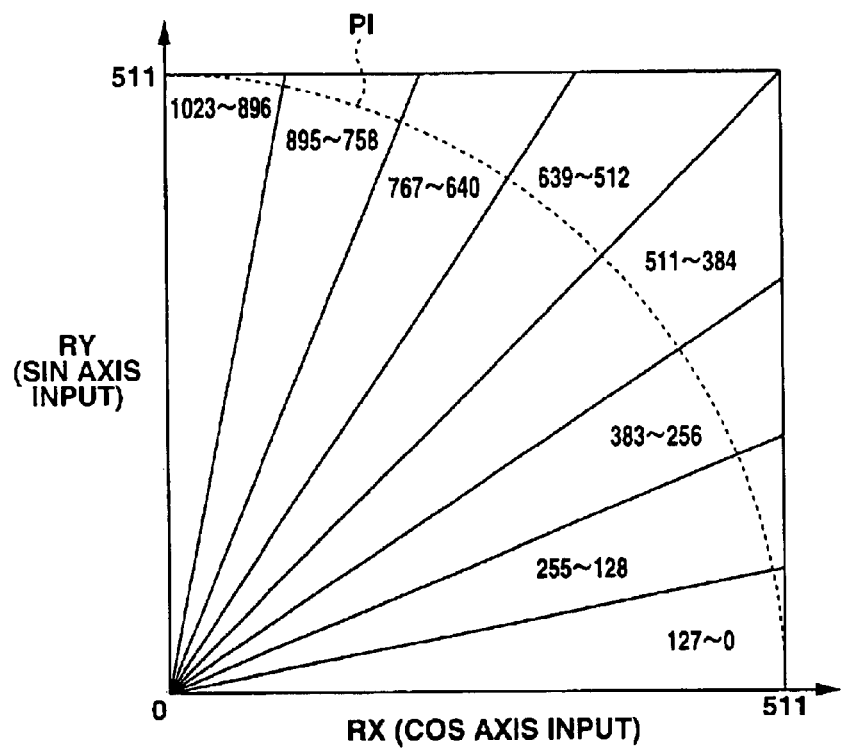
FIG. 18 explains angular data in a polar coordinate transform table stored in a polar coordinate ROM in the polar coordinate transform unit.
Figure 19:
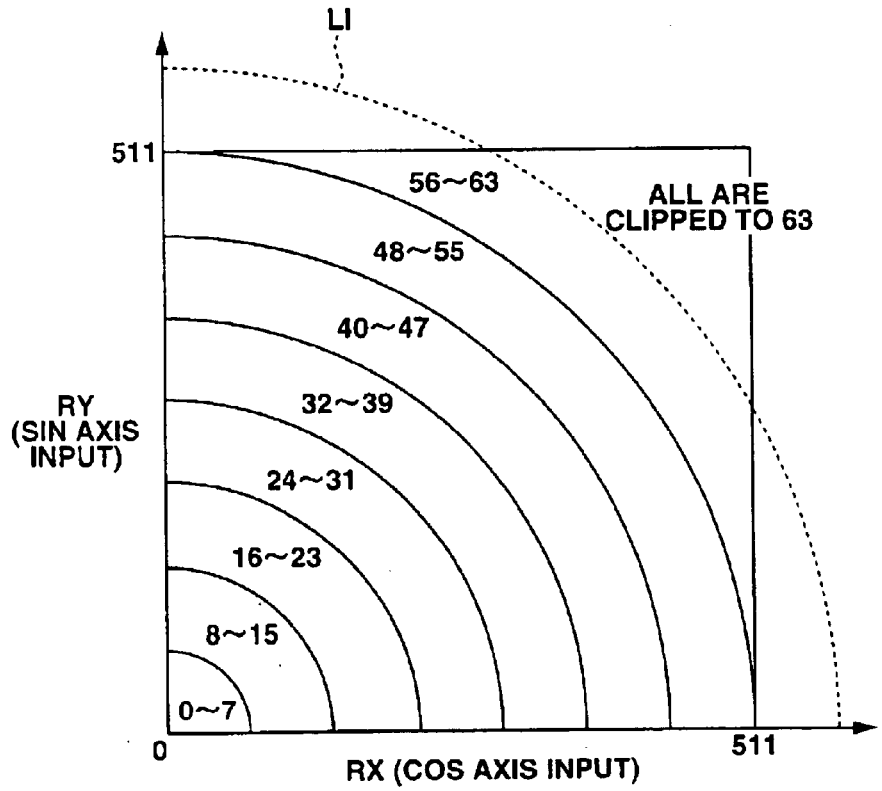
FIG. 19 explains amplitude data in a polar coordinate transform table stored in a polar coordinate ROM in the polar coordinate transform unit.

The polar coordinate table has stored therein data of 16 bits in total including 10 bits of the angle data in the first quadrant and 6 bits of the amplitude data. The angle data is represented by 0 to 90 deg. divided in units of 90 deg./1024 as shown in FIG. 18. Also, the amplitude data is represented by a maximum amplitude on the Sin or Cos axis (Sin data=511 and Cos data=0 or Sin data=0 and Cos data=511), divided by 56 as shown in FIG. 19. The amplitude data is of 6 bits, and so it can be represented by 0 to 63. However, a detected amplitude data takes a larger value than the theoretical one due to a noise or distortion in some cases. With the larger amplitude data than the theoretical one being taken in account, the represented range is margined. It should be noted that all measured amplitude data larger than 63 are clipped to 63.

The polar coordinate ROM 254 provides gray-coded angle and amplitude data corresponding to the first-quadrant Sin data RY and Cos data RX supplied after the polar coordinate transform based on the polar coordinate transform table. The polar coordinate ROM 254 supplies the amplitude data to the first gray decoder 255, and the angle data to the second gray decoder 256.

The first gray decoder 255 decodes the gray code of the amplitude data LI supplied from the polar coordinate ROM 254 into the amplitude data LI of the normal code. The second gray decoder 256 decodes the gray code of the first-quadrant angle data PI supplied from the polar coordinate ROM 254 into the first-quadrant angle data PI of the normal code.

The function of transform of the first-quadrant Sin data RY and Cos data RX into the amplitude data LI and first-quadrant angle data PI, that is, the function including the polar coordinate ROM 254 and gray code conversion, is as follows:

$$PI = \tan^{-1}\{RY/RX\} \times 1024/90$$

$$LI = 56[\sqrt{(RY/511)^2 + (RX/511)^2}]$$

However, all value larger than 63 are clipped to 63.

The quadrant synthesizer 257 adds quadrant indicating data QI supplied from the quadrant divider 251 as higher-order bits of the first-quadrant angle data PI of 10 bits to provide all-around angle data of 12 bits in total.

Thus, the polar coordinate transform unit 250 makes polar coordinate transform of the Sin and Cos data to produce all-around (0 to 360 deg.) angle data PI of 12 bits and amplitude data LI of 6 bits.

Since the polar coordinate ROM 254 stores only a polar coordinate transform table corresponding to the first quadrant, the polar coordinate transform unit 250 has a capacity smaller than all the data in four quadrants.

The polar coordinate ROM 254 also stores, in the gray-coded state, the first-quadrant Sin and Cos data supplied as an address and output angle and amplitude data. Since the Sin and Cos data as positional information on the scale 110 and angle and amplitude data resulted from polar coordinate transform of the Sin and Cos data have sufficiently high A-D sampling frequency, they are successively converted without fail as the scale 110 and pickup head block 120 move in relation to each other unless a noise takes place. On this account, employment of a gray code in which there is only one bit change between adjacent codes permits to reduce the bit change on the bus line during access to the memory, considerably suppress the spike noise and prevent the accuracy from being lowered due to the noise. In this case, the spike noise can be reduced to a half on average as compared with the data not gray coded, and to 1/number of bits in a position where a maximum bit change occurs.

The two all-round angle data PI produced by the first and second phase data detectors 150A and 150B of the phase data detector block 150 are supplied to the phase difference detector 61 of the phase data processor 160. Also, in case a displacement is to be detected by the first phase data detector 150A, the angle data PI and amplitude data LI produced by the first phase data detector 150A are supplied to a displacement detector 166. It should be noted that the angle data PI produced by the first phase data detector 150A will be referred to as "phase data 1", and angle data PI produced by the second phase data detector 150B will be referred to as "phase data 2", hereunder.

In this displacement pickup 100, the phase data processor 160 includes a phase difference detector 161, reference phase difference recorder 162, phase difference coincidence detector 163, phase data recorder 164, reference point (origin) detector 165, displacement detector 166, etc.

In this embodiment, the displacement detector 166 detects a displacement from the angle data PI and amplitude data LI produced by the first phase data detector 150A. A phase data pulse produced by detecting a displacement from the angle data PI and amplitude data LI, indicating a movement of the scale 110 and pickup head block 120, relative to each other, will be referred to as "incremental signal".

The phase data provided as positional information from the displacement pickup 100 consists of two signals (Sin signal 1 and Cos signal 1) having the same period and shifted 4 periods from each other as shown in FIGS. 20A and 20B. More specifically, the displacement detector 166 produces phase data which is increased or decreased one count when the scale 110 and pickup head block 120 have moved relative to each other over a distance equivalent to $\lambda/\text{Div}$ where $\lambda$ is one period of positional signal recorded on the scale 110 and Div is an arbitrary number of output divisions. In other words, the displacement detector 166 produces phase data which is increased or decreased one count when the moving member of an object machine tool has moved $\lambda/\text{Div}$. The number of output divisions Div can arbitrarily be set to 40, 100, 360, 1000 or the like. The phase data thus produced permits to transmit a moving direction of the moving member as well since the amount of information to be carried is extremely small and a travel of the moving member is represented by a gray code. The controller or the like supplied with the phase data as positional information from the displacement pickup 100 can detect a relative travel of the moving member of the machine tool by cumulative addition (subtraction when the moving member has moved in a negative direction) of counts of such phase data.

Also, in the phase data processor 160, the phase difference detector 161 detects a phase difference between the phase data 1 produced by the first phase data detector 150A and phase data 2 produced by the second phase data detector 150B.

Figure 21A:
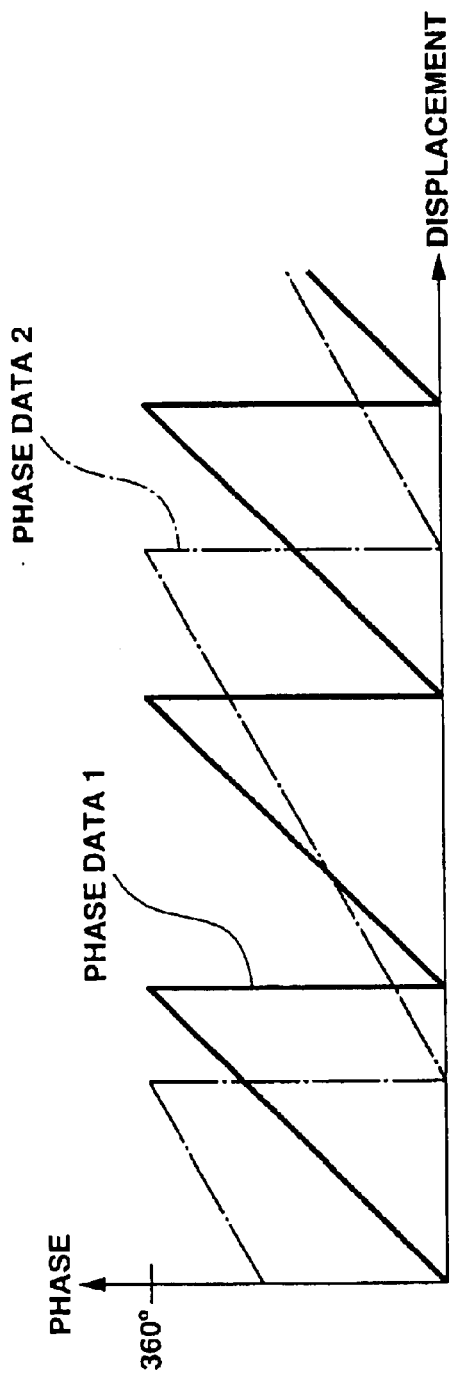
Figure 21B:
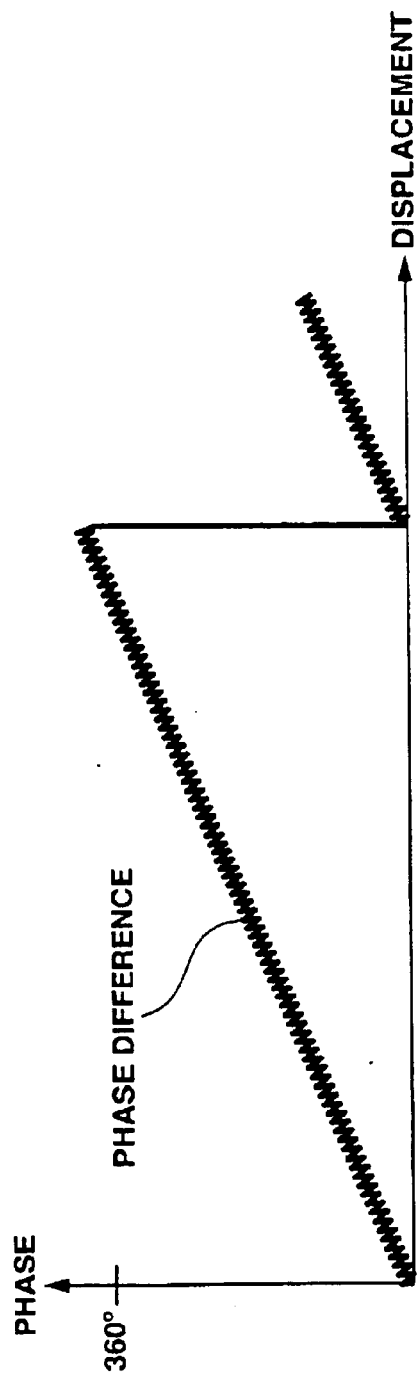

The phase difference between the phase data 1 and 2 as shown in FIG. 21A is not linearly increased or decreased under the influence of external noise in the phase data 1 and 2 and has noise component superposed thereon as shown in FIG. 21B. On this account, the phase data 1 and 2 or the phase difference is filtered by a digital filter to remove high-frequency component and change the phase difference linearly, whereby phase coincidence can be detected with an improved accuracy as will be described in detail later.

In the phase data processor 160, the reference phase difference recorder 162 is put into operation by a signal indicating the detection of a reference phase difference, supplied from an external apparatus 300 or the like. When supplied with an arbitrary reference signal after reception of the detection signal, the reference phase difference recorder 162 adds an arbitrary value $\alpha_1$ to a phase difference detected by the phase difference detector 161, takes the result of addition as a reference phase difference and records it as an optimum reference-point acquisition condition 1. The arbitrary reference signal for supply to the reference phase difference recorder 162 may be any signal which is a reference signal such as a signal mechanically detected by a touch sensor or an external signal. In this embodiment, the arbitrary reference signal is supplied by detecting an origin signal recorded on the scale 110 having the positional signals recorded thereon.

At the time when the reference signal is supplied, the reference phase difference recorder 162 adds a phase-difference period/2 as an arbitrary additional value $\alpha_1$ to the phase difference detected by the phase difference detector 161. Thus, even if the origin disposed on the scale 110 has an error at each displacement, the reference phase difference can be adopted as the optimum reference-point acquisition condition 1 without being influenced by any error if the error is within ±phase-difference period/2.

Also the reference phase difference recorder 162 can detect the reference phase difference again when supplied with a detection signal. In the reference phase difference recorder 162, it is possible to record a reference phase difference as well as to read a reference phase difference from the external apparatus 300 (personal computer, for example) and rewrite the reference phase difference to an arbitrary value. In this case, after a reference phase difference is detected, the reference phase difference recorder 162 can select the detected reference phase difference. After an arbitrary value is written from the external apparatus 300, the reference phase difference recorder 162 can select the arbitrary value.

Also in the phase data processor 160, the phase difference coincidence detector 163 detects a point where the reference phase difference recorded in the reference phase difference recorder 162 coincides with the phase difference detected by the phase difference detector 161 as shown in FIG. 22A.

When the phase difference coincidence detector 163 detects the phase coincidence, it produces a Hi signal as shown in FIG. 22B. The Hi signal is wide before and after one population as shown enlarged in scale in the time-based direction as in FIG. 22C. The population will have an increased width as the displacement increased with a time lapse. To select one phase coincidence point from the population, the phase data processor 160 is designed to recognize, when phase difference coincidence time ≧[1/sampling clock]×β mm/sec, that the phase difference coincides with the reference phase difference and provides a phase difference coincidence signal. By varying the coefficient β, it is possible to vary the optimum accuracy of detection correspondingly to a per-hour travel.

Also in the phase data processor 160, the phase data recorder 164 is put into operation when supplied with a signal indicating detection of a phase data value from the external apparatus 300 or the like. When the phase difference coincidence detector 163 detects the phase coincidence detection signal after reception of the detection signal, the phase data detector 164 takes the result of addition of an arbitrary value $\alpha_2$ to the incremental-side phase data 1 in this embodiment as a reference phase data value and records it as an optimum reference-point acquisition condition 2.

At the time when the phase coincidence detection signal is detected, the phase data recorder 164 adds a period/2 of the phase data 1 as an arbitrary additional value $\alpha_2$ to the incremental-side phase data 1. Thus, even if the phase coincidence signal has an error at each displacement, the reference phase data value can be adopted as the optimum reference-point acquisition condition 2 without being influenced by any error if the error is within ±period of the phase data 1/2.

Also the phase data recorder 164 can detect the phase data value again when supplied with a detection signal. In the phase data recorder 164, it is possible to record phase data as well as to read a phase data from the external apparatus 300 (personal computer, for example) and rewrite the phase data to an arbitrary value. In this case, after a phase data value is detected, the phase data recorder 164 can select the detected phase data value. After an arbitrary value is written from the external apparatus 300, the phase data recorder 164 can select the arbitrary value.

Also in the phase data processor 160, after the reference point (origin) detector 165 detects a phase coincidence signal, it supplies a reference point (origin) signal to the external apparatus 300 when the phase data value recorded or set in the phase data recorder 164 coincides with the phase data 1 detected at each displacement by the first phase data detector 150A.

Figure 23:
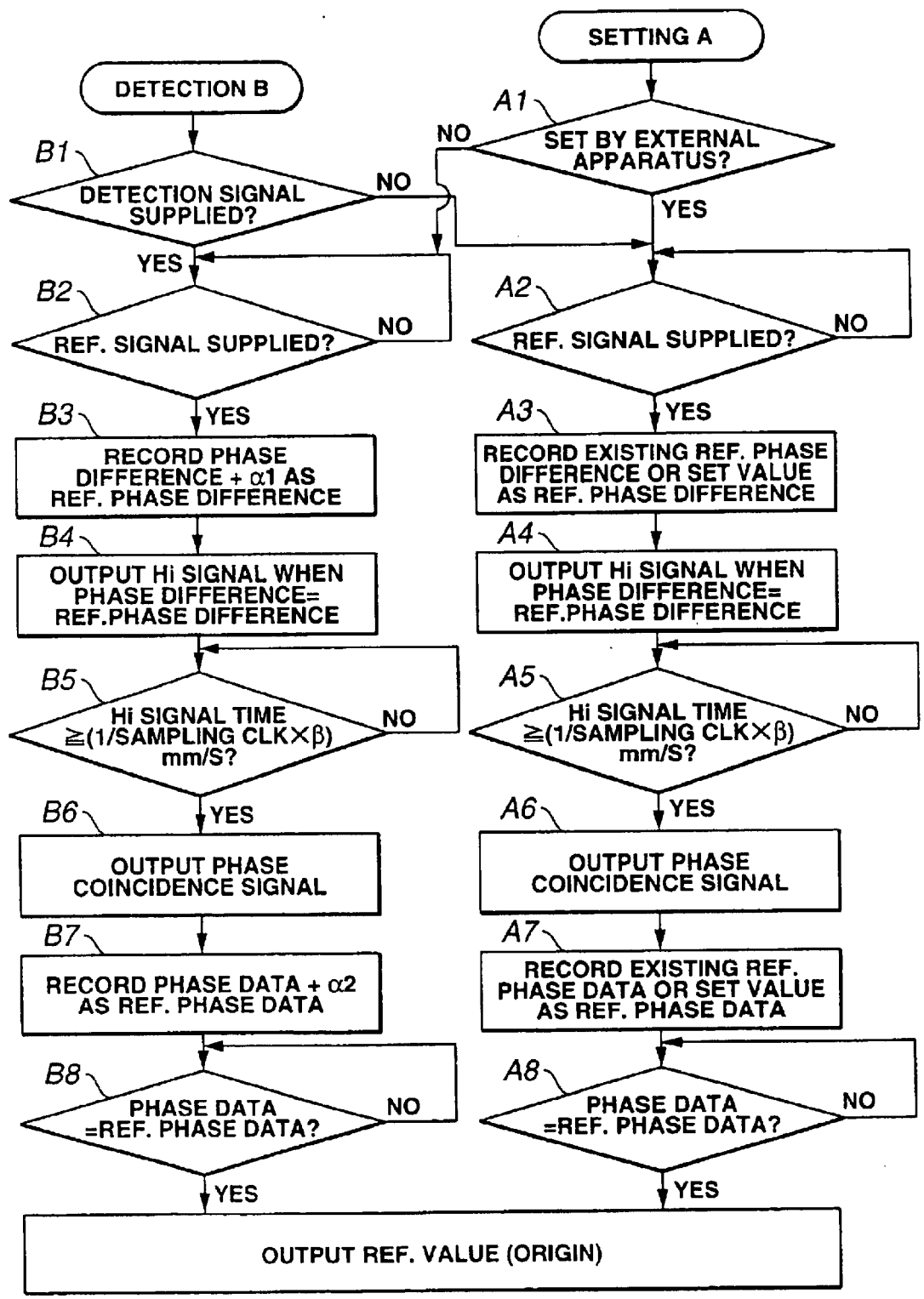
FIG. 23 shows a flow of operations made in the displacement pickup.

In the displacement pickup 100 constructed as above, a setting procedure A and detection procedure B are done as shown in the flowchart in FIG. 23.

In the setting procedure A, it is judged in step A1 whether an instruction to set a reference phase difference and reference phase data has been supplied from the external apparatus 300. When the result of judgment is affirmative (Yes), it is judged in step A2 whether a reference signal has been supplied. On the contrary, if the result of judgement in step A1 is negative (No), the control is passed to step B in the detection procedure B2 where it will be judged whether the reference signal has been supplied.

When the result of judgment in step A2 is affirmative, an existing reference phase difference or set value is recorded as reference phase difference to the reference phase difference recorder 162 in step A3.

Next in step A4, the phase difference detector 161 provides an Hi signal when the phase difference=reference phase difference.

Then in step A5, it is judged whether the phase difference coincidence time ≧[1/sampling clock]×β mm/sec. When the result of judgment is affirmative, it is recognized that the phase difference=the reference phase difference and a phase coincidence signal is provided in step A6.

Further in step A7, the existing reference phase data or set value is recorded as reference phase data to the phase data recorder 164.

In step A8, when the phase data recorded to the phase data recorder 164 or set phase data coincides with the phase data 1 detected at each displacement by the first phase data detector 150A, a reference point (origin) signal is supplied to the external apparatus 300.

In the detection procedure B, when a signal is supplied from the external apparatus 300, it is judged in step B1 whether there has been supplied a detection signal which is to be supplied when a condition (reference phase difference and reference phase data) for detection of a reference point (origin) is acquired or re-acquired. When the result of judgment is affirmative, it is judged in step B2 whether the reference signal has been supplied. When the result of judgment in B2 is negative, the control is passed to step A2 in the setting procedure A where it will be judged whether the reference signal has been supplied.

If the result of judgment in step B2 is affirmative, namely, when the reference signal has been supplied, a reference phase difference $+\alpha_1$ is recorded as the reference phase difference to the reference phase difference recorder 162 in step B3.

Next in step B4, when the phase difference detector 161 detects when the phase difference=reference phase difference, it provides a Hi signal.

In step B5, it is judged whether the phase difference coincidence time$\geq$[1/sampling clock]$\times\beta$ mm/sec. When the result of judgment is affirmative, it is recognized that the phase difference=the reference phase difference and a phase coincidence signal is provided in step B6.

Further in step B7, the phase data+$\alpha_2$ is recorded as reference phase data to the phase data recorder 164.

In step B8, when the phase data recorded to the phase data recorder 164 or set phase data coincides with the phase data 1 detected at each displacement by the first phase data detector 150A, a reference point (origin) signal is supplied to the external apparatus 300.

Figure 24:
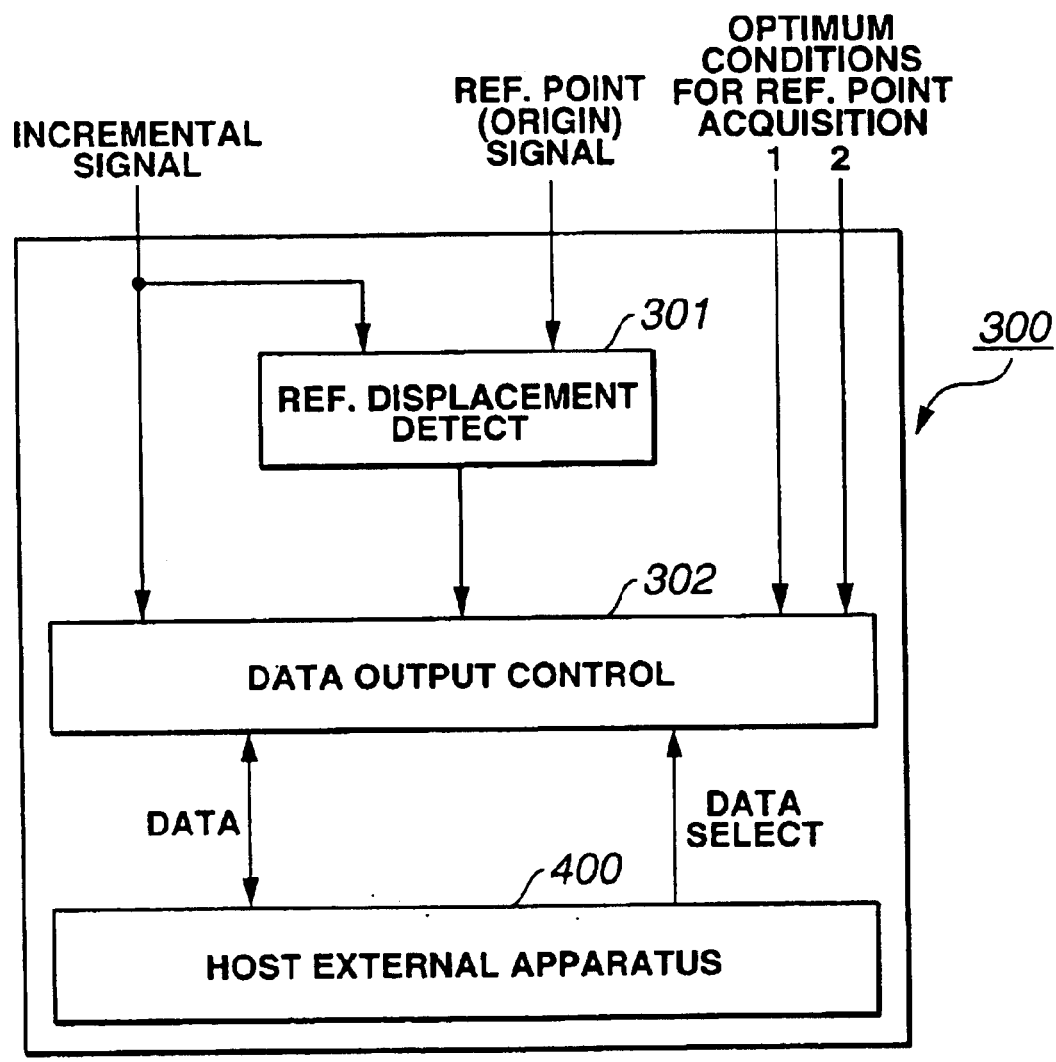
FIG. 24 is a block diagram of an external device connected to the displacement pickup according to the present invention.

The external apparatus 300 includes a reference displacement detector 301, data output controller 302 and a host external apparatus 400 as shown in FIG. 24.

The reference displacement detector 301 is supplied with a phase data, namely, incremental signal, detected by the displacement detector 166, and a reference point (origin) signal detected by the reference point (origin) detector 165, and detects a displacement when a reference point (origin) signal is detected by the reference point (origin) detector 165 from the incremental signal.

Also, the data output controller 302 is supplied with a phase data, namely, incremental signal, detected by the displacement detector 166 and data indicating the optimum reference-point acquisition condition 1 read from the reference phase difference recorder 162 and optimum reference-point acquisition condition 2 read from the phase data recorder 164, and also with the displacement data and reference displacement data from the reference displacement detector 301, and supplies the displacement data, reference displacement data and the data indicating the optimum reference-point acquisition conditions 1 and 2 to the host external apparatus 400.

In case the host external apparatus 400 is a hard disk drive included in a personal computer, for example, the data output controller 302 records the displacement data, reference displacement data and the data indicating the optimum reference-point acquisition conditions 1 and 2 to the hard disk by outputting each of the data in a manner corresponding to a means for communication with the hard disk drive.

Note that the host external apparatus 400 may be an apparatus provided with EEPROMs for recording the data separately, LEDs to indicate the data and DIP switches for making direction settings, or the like, in addition to the hard disk drive of the personal computer.

In the displacement pickup 100 constructed as above, if a trouble such as power interruption, circuit block failure or the like takes place, a reference point (origin) can be detected in the same condition as before the trouble by re-setting, at the recovery from the trouble, the reference phase difference recorder 162 and phase data recorder 164 on the basis of the optimum reference-point acquisition conditions 1 and 2 recorded in the external apparatus 300.

Note that although the displacement pickup 150 and 160 have been illustrated and explained as a PLD (programmable logic device) in the foregoing, it can be implemented by a hardware or software.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

What is claimed is:

1. A displacement pickup comprising:
   a movable scale having defined thereon a first area where positional information is recorded with a predetermined pitch and a second area where positional information is recorded with a pitch different from that in the first area;
   a first reading means for reading the positional information recorded in the first area;
   a first phase detecting means for detecting a first phase on the basis of the positional information read by the first reading means;
   a second reading means for reading the positional information recorded in the second area;
   a second phase detecting means for detecting a second phase on the basis of the positional information read by the second reading means;
   a phase comparing means for comparing the first and second phases with each other; and
   a signal selecting means for generating a plurality of signals according to a result of the comparison from the phase comparing means and selecting an arbitrary one of the plurality of signals on the basis of the positional information read by the first reading means,
   the first and second areas being formed on the scale to be displaceable equal distances in the same measuring direction.

2. The apparatus as set forth in claim 1, further comprising an origin signal generating means for generating an origin signal according to the result of comparison supplied from the phase comparing means,
   the signal selecting means for determining an interval at which a plurality of origin signals is produced by the origin signal generating means on the basis of the positional information read by the first reading means and selecting the arbitrary signal as an origin signal on the basis of the interval.

3. The apparatus as set forth in claim 1, further comprising a detection level signal output means for providing a signal (will be referred to as "detection level signal" hereunder) corresponding to the detection level of the positional signal read by the second reading means,
   the detection level signal output means providing the detection level signal to the signal selecting means; and
   the signal selecting means selecting the arbitrary signal as an origin signal on the basis of the positional signal read by the first reading means when the detection level signal has a predetermined value.

4. The apparatus as set forth in claim 3, wherein the second area has the positional information recorded with the direction of the grating vector of the latter being displaced a predetermined extent in the measuring direction.

5. The apparatus as set forth in claim 1, wherein the scale has the first area defined on one side thereof with respect to the measuring direction and the second area defined at the other side.

6. The apparatus as set forth in claim 1, wherein the scale has the second area defined across the first area.

7. The apparatus as set forth in claim 1, wherein the scale has the first and second areas defined superposed one on the other like layers in the vertical direction.

8. The apparatus as set forth in claim 1, wherein:
the second area has recorded therein the positional information with a pitch displaced a predetermined distance from each other;
the phase comparing means supplies the signal selecting means with a result of comparison corresponding to the displacement of the positional information recorded in the second area; and
the signal selecting means produces a plurality of signals whose recorded pitch varies depending upon the result of comparison and selects an arbitrary one of the plurality of signals on the basis of the positional information read by the first reading means.

9. The apparatus as set forth in claim 1, wherein the second area has recorded therein the positional information with a pitch increased or decreased linearly in the measuring direction.

10. The apparatus as set forth in claim 1, wherein the second area has formed repeatedly in the measuring direction therein a pattern in which the positional information is recorded with the same pitch in the same section and with different pitches in adjacent sections.

11. The apparatus as set forth in claim 10, wherein at least one origin signal is detected from each of the sections.

12. The apparatus as set forth in claim 1, wherein the second area is formed from two sections different in positional-information recording pitch from each other and which are laid repeatedly in a predetermined sequence in the measuring direction.

13. The apparatus as set forth in claim 1, wherein the second area has a range readable by the second reading means defined by a predetermined processing for only a limited number of origin signals to be readable.

14. The apparatus as set forth in claim 1, wherein the origin signal generating means further includes a value setting means for setting an arbitrary value so that the origin signal generating means will produce an origin signal when a difference between the first and second phases takes the arbitrary value.

15. The apparatus as set forth in claim 1, wherein the origin signal generating means produces an origin signal only when a difference between the first and second phases is zero.

16. The apparatus as set forth in claim 1, wherein the origin signal generating means produces an origin signal when a difference between the first and second phases has taken a set value a predetermined number of times.

17. The apparatus as set forth in claim 1, further comprising:
a phase selecting means for selecting either the first or second phase; and
a value setting means for setting an arbitrary value so that the origin signal generating means will produce an origin signal when any of the phases selected by the phase selecting means takes the arbitrary value after a difference between the first and second phases takes a set arbitrary value.

18. The apparatus as set forth in claim 17, wherein the origin signal generating means produces an origin signal when the phase selected by the phase selecting means takes a value set by the value setting means in a position after the difference between the first and second phases takes a set value and then the phase difference takes the set value which appears again in a position a predetermined distance apart from the above position.

19. The apparatus as set forth in claim 18, wherein:
the predetermined distance is $(2n+1)\Lambda/2$ where $\underline{n}$ is an integer larger than zero and $\Lambda$ is a pitch with which the diffraction gratings are recorded in the first area in case the first phase difference is selected by the phase selecting means, while being a pitch with which the diffraction gratings are recorded in the second area in case the second phase difference is selected by the phase selecting means.

20. The apparatus as set forth in claim 1, wherein:
the positional information recorded in the first and second areas defined on the scale includes transparent or reflective diffraction gratings;
the first reading means includes a first light source, a first beam splitting means for dividing a light beam from the first light source by two, and a first optical system in which the two divisional light beams are diffracted by the diffraction gratings and the two diffracted light beams are superposed on each other to provide an electric signal; and
the second reading means includes a second light source, a second beam splitting means for dividing a light beam from the second light source by two, and a second optical system in which the two divisional light beams are diffracted by the diffraction gratings and the two diffracted light beams are superposed on each other to provide an electric signal.

21. The apparatus as set forth in claim 20, wherein:
the first reading means further includes a first reflector to reflect the two divisional light beams diffracted by the diffraction gratings back to the diffraction gratings;
the second reading means further includes a second reflector to reflect the two divisional light beams diffracted by the diffraction gratings back to the diffraction gratings;
the first optical system superposes the diffracted light beams having been diffracted by the diffraction gratings several times; and
the second optical system superposes the diffracted light beams having been diffracted by the diffraction gratings several times.

22. The apparatus as set forth in claim 21, wherein the coherence lengths of the first and second coherent light sources is within 200 $\mu$m.

23. The apparatus as set forth in claim 21, further comprising:
a first modulation degree detecting means for detecting a degree of modulation when the two diffracted light beams are caused to interfere with each other in the first optical system;
a first monitoring means for monitoring the change of optical path length difference on the basis of the result of detection from the first modulation degree detecting means;
a second modulation degree detecting means for detecting a degree of modulation when the two diffracted light beams are caused to interfere with each other in the second optical system; and a second monitoring means for monitoring the change of optical path length difference on the basis of the result of detection from the second modulation degree detecting means.

24. The apparatus as set forth in claim 20, wherein:
the scale is a one having a first area defined thereon and second areas defined thereon on either side of the first area or a one having a first area and second area defined in stack perpendicularly to a direction in which positional information is read by the first and second reading means; and
the optical paths along which the diffracted light beams superposed by the first optical system travel are disposed centrosymmetrically with each other with respect to a direction in which the scale is displaced.

25. The apparatus as set forth in claim 20, wherein:
the first optical system further includes a first adjuster for a maximum ratio of modulation; and
the second optical system further includes a second adjuster for a maximum ratio of modulation.

26. The apparatus as set forth in claim 20, wherein one light source is used in common as the first and second light sources.

27. The apparatus as set forth in claim 20, wherein:
the scale is a one having a first area defined thereon and second areas defined thereon on either side of the first area or a one having a first area and second area defined in stack perpendicularly to a direction in which positional information is read by the first and second reading means;
one light source is used in common as the first and second light sources; and
one beam splitter is used in common as the first and second beam splitters.

28. The apparatus as set forth in claim 20, wherein:
the first light source is connected to the first beam splitter with an optical fiber through which the light beam is guided for incidence upon the first beam splitter;
the first beam splitter is connected to the first optical system with an optical fiber through which the light beam is guided for incidence upon the first optical system;
the second light source is connected to the second beam splitter with an optical fiber through which the light beam is guided for incidence upon the second beam splitter; and
the second beam splitter is connected to the second optical system with an optical fiber through which the light beam is guided for incidence upon the second optical system.

29. The apparatus as set forth in claim 28, wherein the first and light sources, and the first and second optical systems are provided outside the apparatus.

30. The apparatus as set forth in claim 20, wherein:
the first light source is connected to the first beam splitter with an optical fiber through which the light beam is guided for incidence upon the first beam splitter;
a photodetector in the first optical system is connected to each of other components of the first optical system with an optical fiber through which the light beam is guided for incidence upon the other components;
the second light source is connected to the second beam splitter with an optical fiber through which the light beam is guided for incidence upon the second beam splitter; and
a photodetector in the second optical system is connected to each of other components of the second optical system with an optical fiber through which the light beam is guided for incidence upon the other components.

31. The apparatus as set forth in claim 30, wherein the first and light sources, and the photodetectors in the first and second optical systems are provided outside the apparatus.

32. A displacement pickup in which first phase information having an arbitrary period and second phase information having a period different from that of the first phase information are detected by a pickup head block from a scale to pickup up positional information from the first and second phase information, the apparatus comprising:
a polar coordinate transforming unit which transforms the first and second positional information into angular data indicating positions of the scale and pickup head block in relation to each other and amplitude data;
a phase difference detector which detects a difference between phase data 1 which is the angular data resulted from transformation of the first phase information by the polar coordinate transform unit and phase data 2 which is the angular data resulted from transformation of the second phase information by the polar coordinate transform unit;
a reference phase difference recorder which records, as a reference phase difference, the difference between the first and second phase data 1 and 2 at a time when an arbitrary signal is supplied;
a phase-difference coincidence detector which detects when the per-displacement phase difference detected by the phase difference detector and the reference phase difference recorded in the reference phase difference recorder are coincident with each other;
a phase data recorder which records the phase data 1 and/or 2 at a time when the coincidence between the phase differences is detected by the phase-difference coincidence detector; and
a reference point signal detector which detects, at each displacement, coincidence between the phase differences and coincidence between the phase data 1 or 2 recorded in the phase data recorder and the phase data 1 or 2 supplied from the polar coordinate transform unit to produce a reference point signal.

33. The apparatus as set forth in claim 32, having a function to provide the reference phase difference recorded in the reference phase difference recorder to outside and change, from outside, the reference phase difference recorded in the reference phase difference recorder.

34. The apparatus as set forth in claim 32, wherein the phase-difference coincidence detector can vary the optimum accuracy of detection by recognizing, as a phase-difference coincidence point, a point where the time for which phase difference and reference phase reference are coincident with each other $\geq$(1/sampling clock)$\times \beta$ mm, providing a phase-coincidence signal as an output and changing the coefficient $\beta$.

35. The apparatus as set forth in claim 32, having a function to provide phase data 1 or 2 recorded in the phase data recorder is provided to outside and changing, from outside, the phase data 1 and/or 2 recorded in the phase data recorder.

36. The apparatus as set forth in claim 32, wherein an arbitrary value $\alpha_1$ is added to a phase difference detected by the phase difference detector and the resulted value is recorded as a reference phase value to the reference phase different recorder.

37. The apparatus as set forth in claim 32, wherein an arbitrary value $\alpha_2$ is added to the phase data 1 or 2 supplied from the polar coordinate transform unit and the resulted value is recorded as a reference phase value to the reference phase different recorder.

38. The apparatus as set forth in claim 32, wherein the reference point signal detector detects and takes as a reference point signal, at each detection of a displacement, a point where the phase data 1 or 2 recorded in the phase data recorder coincides with the phase data 1 or 2 supplied from the polar coordinate transform unit after the phase-difference coincidence detector detects coincidence of phase differences with each other.

39. The apparatus as set forth in claim 32, further comprising a displacement detector which produces and outputs an incremental signal from angular data indicating positions of the scale and pickup head block in relation to each other and amplitude data.

* * * * *